(12) United States Patent
Filev et al.

(10) Patent No.: US 9,707,975 B2
(45) Date of Patent: Jul. 18, 2017

(54) VEHICLE AND METHOD FOR ADVISING DRIVER OF SAME

(75) Inventors: Dimitar Petrov Filev, Novi, MI (US); Jianbo Lu, Livonia, MI (US); Kwaku O. Prakah-Asante, Commerce Township, MI (US); Fazal Urrahman Syed, Canton, MI (US); Fling Tseng, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 403 days.

(21) Appl. No.: 13/063,393

(22) PCT Filed: Oct. 30, 2009

(86) PCT No.: PCT/US2009/062699
§ 371 (c)(1),
(2), (4) Date: Mar. 10, 2011

(87) PCT Pub. No.: WO2010/051414
PCT Pub. Date: May 6, 2010

(65) Prior Publication Data
US 2011/0193693 A1 Aug. 11, 2011

Related U.S. Application Data

(60) Provisional application No. 61/109,584, filed on Oct. 30, 2008.

(51) Int. Cl.
*G05D 1/00* (2006.01)
*B60W 50/16* (2012.01)
(Continued)

(52) U.S. Cl.
CPC ............ *B60W 50/16* (2013.01); *B60W 40/09* (2013.01); *B60W 40/107* (2013.01); *B60W 30/16* (2013.01);
(Continued)

(58) Field of Classification Search
CPC combination set(s) only.
See application file for complete search history.

(56) References Cited

U.S. PATENT DOCUMENTS

| | | | |
|---|---|---|---|
| 4,031,509 A | 6/1977 | Matulevich | |
| 4,101,870 A | 7/1978 | Ekman | |

(Continued)

FOREIGN PATENT DOCUMENTS

| | | |
|---|---|---|
| DE | 10320722 A1 | 11/2004 |
| DE | 102004013655 A1 | 11/2004 |

(Continued)

OTHER PUBLICATIONS

International Search Report and Written Opinion from PCT/US2009/062698, mailed Jan. 4, 2010.
(Continued)

*Primary Examiner* — Jonathan L Sample
(74) *Attorney, Agent, or Firm* — Jennifer M. Stec; Brooks Kushman P.C.

(57) ABSTRACT

A method for advising a driver of a vehicle including a haptic driver interface may include determining a speed of the vehicle, determining a distance between the vehicle and another vehicle, and activating the haptic driver interface based on the speed and distance.

12 Claims, 17 Drawing Sheets

(51) Int. Cl.
*B60W 40/09* (2012.01)
*B60W 40/107* (2012.01)
*B60W 30/16* (2012.01)

(52) U.S. Cl.
CPC ... *B60W 2540/30* (2013.01); *B60W 2550/308* (2013.01)

(56) References Cited

U.S. PATENT DOCUMENTS

| | | | |
|---|---|---|---|
| 4,243,248 A * | 1/1981 | Scholz | B60R 21/0132 |
| | | | 280/735 |
| 4,858,135 A | 8/1989 | Clish et al. | |
| 4,933,668 A | 6/1990 | Oyer et al. | |
| 5,189,621 A | 2/1993 | Onari et al. | |
| 5,345,385 A | 9/1994 | Zomotor et al. | |
| 5,519,614 A | 5/1996 | Miichi et al. | |
| 5,521,823 A | 5/1996 | Akita et al. | |
| 5,561,603 A | 10/1996 | Goto | |
| 5,611,753 A | 3/1997 | Kondo et al. | |
| 5,633,642 A | 5/1997 | Hoss et al. | |
| 5,655,995 A | 8/1997 | Kondo et al. | |
| 5,754,099 A | 5/1998 | Nishimura et al. | |
| 5,983,154 A | 11/1999 | Morisawa | |
| 6,038,505 A | 3/2000 | Probst et al. | |
| 6,070,118 A | 5/2000 | Ohta et al. | |
| 6,092,005 A | 7/2000 | Okada | |
| 6,125,314 A | 9/2000 | Graf et al. | |
| 6,150,932 A | 11/2000 | Kenue | |
| 6,160,476 A | 12/2000 | Ponziani | |
| 6,188,945 B1 | 2/2001 | Graf et al. | |
| RE37,434 E | 11/2001 | Onari et al. | |
| 6,374,173 B1 | 4/2002 | Ehlbeck | |
| 6,449,542 B1 | 9/2002 | Bottiger et al. | |
| 6,516,273 B1 | 2/2003 | Pierowicz et al. | |
| 6,547,697 B1 | 4/2003 | Taffin et al. | |
| 6,553,301 B1 | 4/2003 | Chhaya et al. | |
| 6,661,345 B1 | 12/2003 | Bevan et al. | |
| 6,695,294 B2 | 2/2004 | Miller et al. | |
| 6,718,247 B1 | 4/2004 | Graf et al. | |
| 6,827,668 B2 | 12/2004 | Frei et al. | |
| 6,830,537 B1 | 12/2004 | Hollenbeck | |
| 6,882,919 B2 | 4/2005 | Lee et al. | |
| 7,124,027 B1 * | 10/2006 | Ernst, Jr. | B60W 30/09 |
| | | | 340/435 |
| 7,178,613 B2 | 2/2007 | Yanaka et al. | |
| 7,349,767 B2 * | 3/2008 | Kuge | B60W 40/09 |
| | | | 340/435 |
| 7,391,305 B2 * | 6/2008 | Knoll | B60R 16/0232 |
| | | | 340/435 |
| 7,400,963 B2 | 7/2008 | Lee et al. | |
| 7,509,214 B2 | 3/2009 | Nagel | |
| 7,596,242 B2 | 9/2009 | Breed et al. | |
| 7,778,742 B2 * | 8/2010 | Kuge | B60W 40/09 |
| | | | 180/275 |
| 7,902,972 B2 | 3/2011 | Söderkvist et al. | |
| 7,966,119 B2 * | 6/2011 | Sugano | B60W 30/16 |
| | | | 701/301 |
| 8,000,874 B2 * | 8/2011 | Tange | B60T 7/22 |
| | | | 701/301 |
| 8,028,789 B2 | 10/2011 | Huang et al. | |
| 8,290,665 B2 * | 10/2012 | Placke | B60K 31/0008 |
| | | | 180/271 |
| 8,519,853 B2 | 8/2013 | Eskandarian et al. | |
| 2001/0021891 A1 | 9/2001 | Kusafuka et al. | |
| 2002/0013650 A1 | 1/2002 | Kusafuka et al. | |
| 2002/0019703 A1 | 2/2002 | Levine | |
| 2002/0059017 A1 | 5/2002 | Yamane et al. | |
| 2002/0091479 A1 * | 7/2002 | Maruko | B60T 7/22 |
| | | | 701/96 |
| 2002/0161501 A1 | 10/2002 | Dulin et al. | |
| 2003/0014174 A1 | 1/2003 | Giers | |
| 2003/0176259 A1 | 9/2003 | Frei et al. | |
| 2004/0034460 A1 | 2/2004 | Folkerts et al. | |
| 2004/0090320 A1 * | 5/2004 | Suzuki | B60K 31/0008 |
| | | | 340/435 |
| 2004/0102887 A1 | 5/2004 | Lin et al. | |
| 2004/0195022 A1 | 10/2004 | Inoue | |
| 2004/0199327 A1 * | 10/2004 | Isogai | B60K 31/0008 |
| | | | 701/301 |
| 2004/0201471 A1 | 10/2004 | Primm et al. | |
| 2004/0210757 A1 | 10/2004 | Kogan et al. | |
| 2004/0212506 A1 | 10/2004 | Cherouny et al. | |
| 2004/0259687 A1 | 12/2004 | Ritter et al. | |
| 2005/0010352 A1 | 1/2005 | Michi et al. | |
| 2005/0065687 A1 | 3/2005 | Hijikata et al. | |
| 2005/0131588 A1 * | 6/2005 | Kuge | B60W 40/09 |
| | | | 701/1 |
| 2005/0182549 A1 * | 8/2005 | Seki | B60T 7/22 |
| | | | 701/70 |
| 2005/0234626 A1 | 10/2005 | Shiiba et al. | |
| 2005/0273215 A1 * | 12/2005 | Kuge | B60T 8/17551 |
| | | | 701/1 |
| 2006/0048988 A1 | 3/2006 | Dreibholz et al. | |
| 2006/0052909 A1 | 3/2006 | Cherouny | |
| 2006/0097570 A1 * | 5/2006 | Doerr | B60Q 1/44 |
| | | | 303/193 |
| 2006/0109094 A1 | 5/2006 | Prakah-Asante et al. | |
| 2006/0145827 A1 * | 7/2006 | Kuge | B60K 31/0008 |
| | | | 340/439 |
| 2006/0158031 A1 | 7/2006 | Kummel et al. | |
| 2006/0173601 A1 | 8/2006 | Bassiere et al. | |
| 2006/0173621 A1 * | 8/2006 | Stopczynski | B60W 30/09 |
| | | | 701/301 |
| 2006/0180379 A1 | 8/2006 | Ferrone et al. | |
| 2006/0195231 A1 | 8/2006 | Diebold et al. | |
| 2006/0208564 A1 | 9/2006 | Yuda et al. | |
| 2006/0220908 A1 * | 10/2006 | Petersen | B60T 7/22 |
| | | | 340/903 |
| 2007/0008090 A1 | 1/2007 | Gertsch et al. | |
| 2007/0013498 A1 | 1/2007 | Knoll et al. | |
| 2007/0030132 A1 * | 2/2007 | Kobayashi | B60W 50/16 |
| | | | 340/436 |
| 2007/0050110 A1 | 3/2007 | Kondoh et al. | |
| 2007/0063855 A1 | 3/2007 | Maass | |
| 2007/0083316 A1 | 4/2007 | Kurz et al. | |
| 2007/0112500 A1 | 5/2007 | Ogawa | |
| 2007/0132563 A1 * | 6/2007 | Balbale | B60Q 9/004 |
| | | | 340/435 |
| 2007/0213915 A1 * | 9/2007 | Tange | B60T 7/22 |
| | | | 701/96 |
| 2007/0272464 A1 * | 11/2007 | Takae | B60W 10/06 |
| | | | 180/169 |
| 2007/0276582 A1 * | 11/2007 | Coughlin | B60W 40/09 |
| | | | 701/123 |
| 2007/0288140 A1 | 12/2007 | Wheals et al. | |
| 2008/0023253 A1 * | 1/2008 | Prost-Fin | B60K 35/00 |
| | | | 180/400 |
| 2008/0027607 A1 | 1/2008 | Ertl et al. | |
| 2008/0042813 A1 | 2/2008 | Wheatley et al. | |
| 2008/0065293 A1 * | 3/2008 | Placke | B60K 31/0008 |
| | | | 701/41 |
| 2008/0114564 A1 | 5/2008 | Ihara | |
| 2008/0147249 A1 * | 6/2008 | Kuge | B60W 50/10 |
| | | | 701/1 |
| 2008/0147277 A1 | 6/2008 | Lu et al. | |
| 2008/0161984 A1 | 7/2008 | Hrdlicka et al. | |
| 2008/0167775 A1 | 7/2008 | Kuttenberger et al. | |
| 2008/0272898 A1 * | 11/2008 | Irion | B60Q 9/008 |
| | | | 340/436 |
| 2008/0319602 A1 * | 12/2008 | McClellan | G07C 5/008 |
| | | | 701/31.4 |
| 2009/0037062 A1 | 2/2009 | Lee et al. | |
| 2009/0088941 A1 | 4/2009 | Tsuchiya et al. | |
| 2009/0099727 A1 | 4/2009 | Ghoneim | |
| 2009/0132294 A1 | 5/2009 | Haines | |
| 2009/0143961 A1 | 6/2009 | Gaviani et al. | |
| 2009/0146846 A1 | 6/2009 | Grossman | |
| 2009/0212930 A1 * | 8/2009 | Pfeiffer | B60Q 9/008 |
| | | | 340/435 |

(56) References Cited

U.S. PATENT DOCUMENTS

| | | | |
|---|---|---|---|
| 2009/0234553 A1* | 9/2009 | Sekiguchi | B60W 30/16 701/96 |
| 2009/0312926 A1 | 12/2009 | Macfarlane et al. | |
| 2009/0326753 A1 | 12/2009 | Chen et al. | |
| 2010/0023223 A1 | 1/2010 | Huang et al. | |
| 2010/0023265 A1 | 1/2010 | Huang et al. | |
| 2010/0030434 A1* | 2/2010 | Okabe | A61B 5/165 701/48 |
| 2010/0152951 A1 | 6/2010 | Chin et al. | |
| 2010/0208070 A2 | 8/2010 | Haynes et al. | |
| 2010/0209883 A1 | 8/2010 | Chin et al. | |
| 2010/0209884 A1 | 8/2010 | Lin et al. | |
| 2010/0209888 A1 | 8/2010 | Huang et al. | |
| 2010/0209889 A1 | 8/2010 | Huang et al. | |
| 2010/0209890 A1 | 8/2010 | Huang et al. | |
| 2010/0209891 A1 | 8/2010 | Lin et al. | |
| 2010/0209892 A1 | 8/2010 | Lin et al. | |
| 2010/0211270 A1 | 8/2010 | Chin et al. | |
| 2010/0214087 A1* | 8/2010 | Nakagoshi | A61B 5/18 340/436 |
| 2010/0241313 A1 | 9/2010 | Fiske et al. | |
| 2010/0299043 A1* | 11/2010 | Dorenkamp | B60W 30/16 701/96 |
| 2011/0004387 A1* | 1/2011 | Sugano | B60W 30/16 701/96 |
| 2011/0050459 A1 | 3/2011 | Vasireddy et al. | |
| 2011/0102166 A1 | 5/2011 | Filev et al. | |
| 2011/0106381 A1* | 5/2011 | Filev | B62D 6/007 701/40 |
| 2011/0118929 A1* | 5/2011 | Takae | B60W 50/16 701/31.4 |
| 2011/0187520 A1 | 8/2011 | Filev et al. | |
| 2012/0212353 A1* | 8/2012 | Fung | B60K 28/06 340/905 |
| 2013/0110349 A1 | 5/2013 | Tseng et al. | |

FOREIGN PATENT DOCUMENTS

| | | |
|---|---|---|
| EP | 0992387 | 4/2000 |
| EP | 1695859 A1 | 3/2006 |
| WO | 03039899 | 5/2003 |

OTHER PUBLICATIONS

International Search Report and Written Opinion from PCT/US09/62699, mailed Dec. 14, 2009.

International Search Report and Written Opinion from PCT/US09/62724, mailed filed Jan. 12, 2010.

International Search Report and Written Opinion from PCT/US09/62697, mailed Dec. 17, 2009.

Abstract for DE 19833645 (corresponding to EP 0992387).

* cited by examiner

VEHICLE AND METHOD FOR ADVISING DRIVER OF SAME

CROSS-REFERENCE TO RELATED APPLICATION

This application is a U.S. national phase of PCT Application No. PCT/US2009/062699, filed Oct. 30, 2009, which claims the benefit of U.S. provisional Application Ser. No. 61/109,584, filed Oct. 30, 2008, the disclosures of which are hereby incorporated by reference in their entirety.

BACKGROUND

Driver error is cited as the cause of 45% to 75% of roadway collisions and as a contributing factor in a majority of all collisions.

Lane-Departure Warning (LDW) uses a vision sensor to detect a vehicle's position relative to a lane and warn the driver of an unintentional lane departure. Certain Forward Collision Warning (FCW) systems use environmental sensors to detect potential safety hazards in front of a vehicle and warn the driver in advance. These existing driver warnings, however, operate during steady-state or quasi-steady-state driving conditions.

SUMMARY

A vehicle may include a forward sensing system configured to detect a distance between the vehicle and another vehicle, a haptic driver interface, and at least one controller configured to activate the haptic driver interface if the distance between the vehicles is less than a predefined threshold.

While example embodiments in accordance with the invention are illustrated and disclosed, such disclosure should not be construed to limit the invention. It is anticipated that various modifications and alternative designs may be made without departing from the scope of the invention.

DETAILED DESCRIPTION

I. Introduction

An objective of existing vehicle electronic control systems is to facilitate the driving task by identifying driver intent and aiding the driver by controlling the vehicle to achieve the driver intent safely, robustly, and smoothly. The control effectiveness of electronic control systems may be significantly increased when the driver and the electronic control system work together towards the same accident avoidance goal and maximize the accident avoidance capability of the driver-in-the-loop vehicle as a system. One approach to achieve this is to provide timely clear and transparent advisory information to a driver such that a responsible driver can respond accordingly. Such advisory information can be gathered or computed from sensors normally found on a vehicle, which implement a bilateral closed-loop control between the driver and the electronic control. The electronic control follows the driver intent and the driver responds to the advisory information from the electronic control to modify his drive inputs (such as dropping throttle, easing steering inputs, etc.) In this way, a seamless coordination between the driver and the electronic control system is possible and is likely to minimize the effect of potential safety hazards due to driver errors.

We consider, inter alia, warnings that occur close to the handling limit, a driving or maneuvering condition in which vehicle stability controls usually intervene. In addition to problems encountered near the handling limit, the driver advisory system approach discussed herein can also be used to improve fuel economy, i.e., a system which can use advising and/or coaching to help the driver learn driving habits that conserve fuel. We also discuss using data from vehicle stability controls to provide real-time warnings when the vehicle approaches the handling limit. This may be part of a cluster of warning functions that may be defined as an Intelligent Personal Minder (IPM) system. Generally speaking, the intelligence computed for the IPM system can be sent to warn or advise a driver through various devices including a haptic pedal, a heads-up-display, an audio warning device, a voice system, etc.

Figure 1:
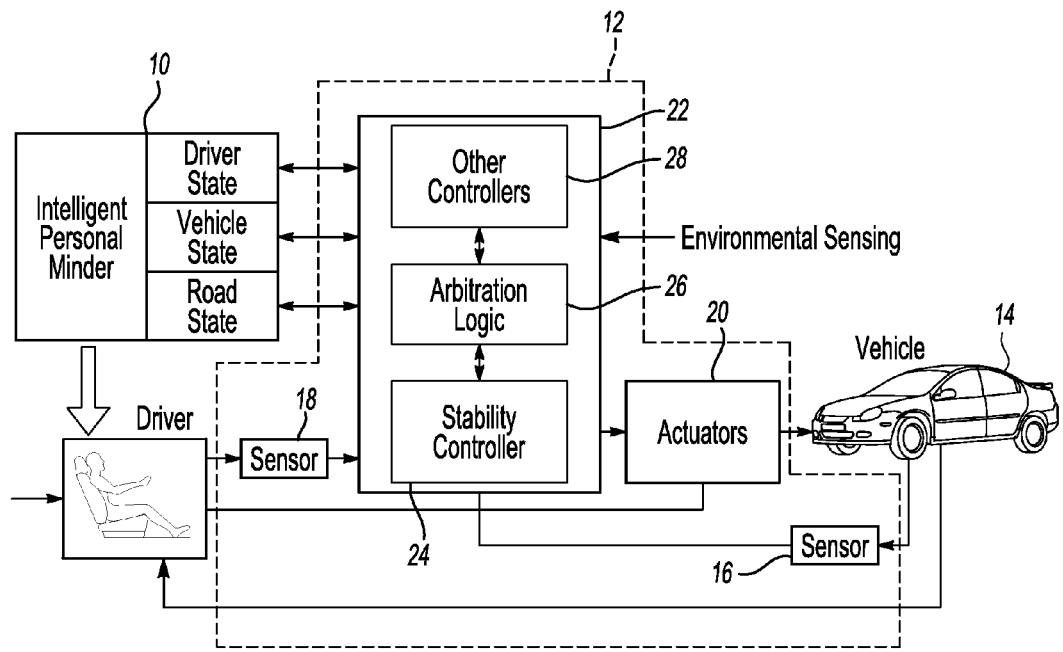
FIG. 1 is a block diagram of an embodiment of a vehicle control system.

FIG. 1 depicts the interaction of an embodiment of an IPM system 10 with other components/subsystems 12 of a vehicle 14. The other components/subsystems 12 may include vehicle sensors 16, (e.g., a yaw rate sensor, steering angle sensor, lateral acceleration sensor, longitudinal acceleration sensor, wheel speed sensor, brake pressure sensor, etc.), actuators 20 and one or more controllers 22. The one or more controllers 22 may include stability control 24, arbitration logic 26 and other controllers/systems 28 (e.g., anti-lock braking system, traction control system, etc.)

For any control system, the plant model may play a role in designing an effective control strategy. Similarly, a driver model is important for generating effective and appropriate driver advisory signals. Hence, driving style characterization may be needed. We discuss methods of identifying a driver's characteristics based on his or her vehicle handling capability. While driver modeling and driver behavior characterization have been studied, we suggest an approach in which the driving behavior/style and/or the driving experience level may be deduced, for example, based on the frequency and duration of driving close to the handling limit (as well as other techniques). Such driver characterization information may be used in a variety of applications, some of which are discussed below.

II. A Brief Discussion of Vehicle Stability Controls

A vehicle's handling determines the vehicle's ability to corner and maneuver. The vehicle needs to stick to the road with its four tire contact patches in order to maximize its handling capability. A tire which exceeds its limit of adhesion is either spinning, skidding or sliding. A condition where one or more tires exceed their limits of adhesion may be called a limit handling condition and the adhesion limit may be called a handling limit. Once a tire reaches its handling limit, the average driver is usually no longer in control. In the so-called understeer case, the car under performs a driver's steering input, its front tires pass their handling limit, and the vehicle continues going straight regardless of the driver's steering request. In the so-called oversteer case, the car over performs the driver's steering inputs, its rear tires pass their handling limit, and the vehicle continues spinning. For safety purposes, most vehicles are built to understeer at their handling limits.

In order to compensate vehicle control in case a driver is unable to control the vehicle at or beyond the handling limit, electronic stability control (ESC) systems are designed to redistribute tire forces to generate a moment that can effectively turn the vehicle consistent with the driver's steering request. Namely, to control the vehicle to avoid understeer and oversteer conditions.

Since its debut in 1995, ESC systems have been implemented in various platforms. Phasing in during model year 2010 and achieving full installation by model year 2012, Federal Motor Vehicle Safety Standard 126 requires ESC systems on any vehicle with a gross weight rating below 10,000 lb. ESC systems may be implemented as an extension of anti-lock braking systems (ABS) and all-speed traction control systems (TCS). They may provide the yaw and lateral stability assist to the vehicle dynamics centered around the driver's intent. It may also proportion brake pressure (above or below the driver applied pressure) to individual wheel(s) so as to generate an active moment to counteract the unexpected yaw and lateral sliding motions of the vehicle. This leads to enhanced steering control at the handling limits for any traction surface during braking, accelerating or coasting. More specifically, current ESC systems compare the driver's intended path to the actual vehicle response which is inferred from onboard sensors. If the vehicle's response is different from the intended path (either understeering or oversteering), the ESC controller applies braking at selected wheel(s) and reduces engine torque if required to keep the vehicle on the intended path and to minimize loss of control of the vehicle.

A limit handling condition can be detected using data already existing in ESC systems, so new sensors may not be required. Consider, for example, a vehicle equipped with an ESC system using a yaw rate sensor, a steering wheel sensor, a lateral accelerometer, a wheel speed sensors, a master cylinder brake pressure sensor, a longitudinal accelerometer, etc. The vehicle motion variables are defined in the coordinate systems as defined in ISO-8855, where a frame fixed on the vehicle body has its vertical axis up, longitudinal axis along the longitudinal direction of the vehicle body, and a lateral axis pointed from the passenger side to the driver side.

Generally speaking, vehicle level feedback controls can be computed from individual motion variables such as yaw rate, sideslip angle, or their combination together with arbitrations among other control commands such as driver braking, engine torque request, ABS and TCS. Vehicle level control commands are discussed in the following.

The well-known bicycle model captures the vehicle dynamics, its yaw rate $\omega_z$ along the vertical axis of the vehicle body and its sideslip angle $\beta_r$ defined at its rear axle, and obeys the following equations $$I_z\dot{\omega}_z = b_f c_f (\beta_r + b\omega_{zt} v_x^{-1} - \delta) + b_r c_r \beta_r + M_z M(\dot{v}_x \beta_r + v_x \dot{\beta}_r + b_r \omega_z + \omega_z v_x) = -c_f (\beta_r + b\omega_{zt} v_x^{-1} - \delta) - c_r \beta_r \quad (1)$$

where $v_x$ is the vehicle's travel speed, M and $I_z$ are the total mass and the yaw moment of inertia of the vehicle, $c_f$ and $c_r$ are the cornering stiffness of the front and rear tires, $b_f$ and $b_r$ are the distances from the center of gravity of the vehicle to the front and rear axles, $b=b_f+b_r$, $M_z$ is the active moment applied to the vehicle, and $\delta$ is the front wheel steering angle.

A target yaw rate $\omega_{zt}$ and a target sideslip angle $\beta_{rt}$ used to reflect the driver's steering intent can be calculated from (1) using the measured steering wheel angle $\delta$ and the estimated travel velocity $v_x$ as the inputs. In such a computation, we assume that the vehicle is driven on a road of normal surface condition (e.g., high friction level with nominal cornering stiffness $c_f$ and $c_r$). Signal conditioning, filtering and nonlinear corrections for steady state limit cornering may also be performed in order to fine tune the target yaw rate and the target sideslip angle. These calculated target values characterize the driver's intended path on a normal road surface.

The yaw rate feedback controller is essentially a feedback controller computed from the yaw error (the difference between the measured yaw rate and the target yaw rate). If the vehicle is turning left and $\omega_z \geq \omega_{rt} + \omega_{zdbos}$ (where $\omega_{zdbos}$ is a time varying deadband), or the vehicle is turning right and $\omega_z \leq \omega_{rt} - \omega_{zdbos}$, the vehicle is oversteering and activating the oversteer control function in ESC. For instance, the active torque request (applied to the vehicle for reducing the oversteer tendency) might be computed as in the following during a left turn: $M_z = \min(0, -k_{os}(\omega_z - \omega_{zt} - \omega_{zdbos}))$ during a right turn: $M_z = \max(0, -k_{os}(\omega_z - \omega_{zt} + \omega_{zdbos}))$ \quad (2)

where $k_{os}$ is a speed dependent gain which might be defined as in the following $$k_{os} = k_0 + (v_x - v_{xdbl})\frac{k_{dbu} - k_{dbl}}{v_{xdbu} - v_{xdbl}} \quad (3)$$

with parameters $k_0$, $k_{dbl}$, $k_{dbu}$, $v_{xdbl}$, $v_{xdbu}$ being tunable.

If $\omega_z \leq \omega_z - \omega_{zdbus}$ (where $\omega_{zdbus}$ is a time varying deadband) when the vehicle is turning left or $\omega_z \geq \omega_z + \omega_{zdbus}$ when the vehicle is turning right, the understeer control function in ESC is activated. The active torque request can be computed as in the following during a left turn: $M_z=\max(0,-k_{us}(\omega_z-\omega_{zt}+\omega_{zdbus}))$ during a right turn: $M_z=\min(0,-k_{us}(\omega_z-\omega_{zt}-\omega_{zdbus}))$ (4)

where $k_{us}$ is a tunable parameter.

The sideslip angle controller is a supplementary feedback controller to the aforementioned oversteer yaw feedback controller. It compares the sideslip angle estimation $\beta_r$ to the target sideslip angle $\beta_{rt}$. If the difference exceeds a threshold $\beta_{rdb}$, the sideslip angle feedback control is activated. For instance, the active torque request is calculated as in the following
during a left turn, $\beta_r \geq 0$: $M_Z = \min(0, k_{ss}(\beta_r - B_{rt} - B_{rdb}) - k_{sscmp}\dot{\beta}_{rcmp})$ during a right turn, $\beta_r < 0$: $M_Z = \max(0, k_{ss}(\beta - \beta_{rt} + B_{rdb}) - k_{sscmp}\dot{\beta}_{rcmp})$ (5)

where $k_{ss}$ and $k_{sscmp}$ are tunable parameters and $\dot{\beta}_{rcmp}$ is a compensated time derivative of the sideslip angle.

Other feedback control terms based on variables such as yaw acceleration and sideslip gradient can be similarly generated. When the dominant vehicle motion variable is either the yaw rate or the sideslip angle, the aforementioned active torque can be directly used to determine the necessary control wheel(s) and the amount of brake pressures to be sent to corresponding control wheel(s). If the vehicle dynamics are dominated by multiple motion variables, control arbitration and prioritization will be conducted. The final arbitrated active torque is then used to determine the final control wheel(s) and the corresponding brake pressure(s). For example, during an oversteer event, the front outside wheel is selected as the control wheel, while during an understeer event, the rear inside wheel is selected as the control wheel. During a large side-slipping case, the front outside wheel is always selected as the control wheel. When both the side slipping and oversteer yawing happen simultaneously, the amount of brake pressure may be computed by integrating both yaw error and the sideslip angle control commands.

Besides the above cases where the handling limit is exceeded due to the driver's steering maneuvers, a vehicle can reach its limit handling condition in its longitudinal motion direction. For example, braking on a snowy and icy road can lead to locked wheels, which increases the stopping distance of the vehicle. Open throttling on a similar road can cause the drive wheels to spin without moving the vehicle forward. For this reason, the handling limit may also be used for these non-steering driving conditions. That is, the conditions where the tire longitudinal braking or driving forces reach their peak values may also be included in a definition of the handling limit.

The ABS function monitors the rotational motion of the individual wheels in relation to the vehicle's travel velocity, which can be characterized by the longitudinal slip ratios $\lambda_i$, with i=1, 2, 3, 4 for the front-left, front-right, rear-left and rear-right wheels, computed as in the following $$\lambda_1 = \frac{\kappa_1 \omega_1}{\max((v_x + \omega_z t_f)\cos(\delta) + (v_y + \omega_z b_f)\sin(\delta), v_{min})} - 1 \quad (6)$$

$$\lambda_2 = \frac{\kappa_2 \omega_2}{\max((v_x + \omega_z t_f)\cos(\delta) + (v_y + \omega_z b_f)\sin(\delta), v_{min})} - 1$$

-continued
$$\lambda_3 = \frac{\kappa_3 \omega_3}{\max(v_x - \omega_z t_r, v_{min})} - 1, \quad \lambda_4 = \frac{\kappa_4 \omega_4}{\max(v_x + \omega_z t_r, v_{min})} - 1$$

where $t_f$ and $t_r$ are the half tracks for the front and rear axles, $\omega_i$ is the $i^{th}$ wheel speed sensor output, $\kappa_i$ is the $i^{th}$ wheel speed scaling factor, $v_y$ is the lateral velocity of the vehicle at its c.g. location, and $v_{min}$ is a preset parameter reflecting the allowable minimum longitudinal speed. Notice that (6) is only valid when the vehicle is not in the reverse driving mode. When the driver initiated braking generates too much slip (e.g., $-\lambda_i \geq \lambda_{bp} = 20\%$) at a wheel, the ABS module will release the brake pressure at that wheel. Similarly, during a large throttle application causing a large slip on the $i^{th}$ driven wheel, the TCS module will request engine torque reduction and/or brake pressure applied to the opposite wheel at the same axle. Consequently, ABS or TCS activations can be predicted by monitoring how close $\lambda_i$s are from $\lambda_{bp}$ and $\lambda_{tp}$.

III. Handling Limit Minder

While the aforementioned ESC (including ABS and TCS) is effective in achieving its safety goal, further enhancement is still possible. For example, augmentation of ESC systems may be desirable for roll stability control. The appropriate correction which ESC tries to make, however, may be counteracted by the driver or ambient conditions. A speeding vehicle, whose tire forces go far beyond the traction capability of the road and the tires, might not be able to avoid an understeer accident even with ESC intervention.

We introduce an integration of the driver and ESC system such that they may work cooperatively towards an enhanced control performance of the driver-in-the-loop system. In certain embodiments, the proposed Handling Limit Minder (HLM) determines how close the current driving condition is to the handling limit.

Generally speaking, accurate determination of the handling limit conditions would involve direct measurements of road and tire characteristics or very intensive information from many related variables if direct measurements are not available. Currently, both of these methods are not mature enough for real-time implementation.

Due to their feedback feature, ESC systems may be configured to determine the potential limit handling conditions through monitoring the motion variables of a vehicle such as those described in the last section. When the motion variables deviate from their reference values by a certain amount (e.g., beyond certain deadbands), the ESC systems may start to compute differential braking control command(s) and determine control wheel(s). The corresponding brake pressure(s) is then sent to the control wheel(s) to stabilize the vehicle. The starting point of the ESC activation can be thought of as the beginning of the handling limit.

More specifically, we may define a relative handling limit margin $h_x$ as in the following $$h_x = \begin{cases} \frac{\bar{x}-x}{\bar{x}} & \text{if } 0 \leq x \leq \bar{x} \\ \frac{x-\underline{x}}{\underline{x}} & \text{if } \underline{x} \leq x < 0 \\ 0 & \text{otherwise} \end{cases} \quad (8)$$

where x is the deviation of a motion variable from its reference value and $[\underline{x},\bar{x}]$ defines the deadband interval within which x falls without initiating the ESC, ABS or TCS.

x can be any of the control variables defined in the last section (or any other suitable control variable).

The benefit of $h_x$ defined in (8) is that the driving condition can be quantitatively characterized into different categories. For instance, when $h_x \leq 10\%$, the driving condition may be categorized as a red zone condition where the driver needs to have special attention or take some special actions (e.g., slowing down the vehicle); when $10\% < h_x < 40\%$, the driving condition may be categorized as a yellow zone condition which needs some level of special attention from the driver; when $40\% < h_x \leq 100\%$, the driving condition may be characterized as a normal condition. In the normal condition, the driver need only to maintain his normal driving attention. Of course, other ranges may also be used.

Various audible and/or visual warnings may be activated to alert a driver about the handling limit margin. When $h_x < 10\%$ for example, a warning light/haptic device may activate to inform the driver that they need to slow down. Alternatively, a voice enabled display system may instruct the driver to take particular action. When $10\% < h_x < 40\%$, an audible tone or display may inform the driver that they are approaching unstable driving conditions, etc.

More specifically, let us use the control variables computed in the last section to discuss the computation of $h_x$s. The vehicle's yaw handling limit margin during oversteer situations $h_{OS}$ (where $\omega_z > \omega_{zt}$ when the vehicle is turning to the left and $\omega_z > \omega_{zt}$ when the vehicle is turning to the right) can be computed from (8) by setting $x = \omega_z - \omega_{zt}$ and $\bar{x} = \omega_{zdbos} = -\underline{x}$, where $\omega_{zdbos}$ is the oversteer yaw rate deadband as defined in (2).

Similarly, the vehicle's yaw handling limit $h_{US}$ for understeer situations can be computed from (8) by setting $x = \omega_z - \omega_{zt}$ and $\bar{x} = \omega_{zdbus} = -\underline{x}$, where $\omega_{zdbus}$ is the understeer yaw rate deadband as defined in (4). Notice that the aforementioned deadbands might be functions of the vehicle speed, the magnitude of the target yaw rate, the magnitude of the measured yaw rate, etc. The deadbands for the understeer situation (x<0) and the oversteer situation (x>0) are different and they are tunable parameters.

The vehicle's sideslip handling limit margin $h_{SSRA}$ can be computed from (8) by setting $x = \beta_r - \beta_{rt}$ and $\bar{x} = \beta_{rdb} = -\underline{x}$.

The longitudinal handling limits of the vehicle involve the conditions when either the driving or braking force of the tires approach the handling limit. The traction control handling limit margin for the $i^{th}$ driven wheel $h_{TCS_i}$ can be computed from (8) by setting $x = \lambda_i$, $\underline{x} = 0$, and $\bar{x} = \lambda_{tb}$. The ABS handling limit margin for the $i^{th}$ wheel $h_{ABS_i}$ can also be computed from (8) by setting $x = \lambda_i$, $\underline{x} = \lambda_{bp}$, and $\bar{x} = 0$. The final traction and braking handling limit margins may be defined as $$h_{ABS} = \min_{i \in \{1,2,3,4\}} h_{ABS_i}, \quad h_{TCS} = \min_{i \in \{1,2,3,4\}} h_{TCS_i} \quad (9)$$

Notice that further screening conditions may be used in computing the aforementioned handling limit margins. For instance, one of the following or the combination of some of the following conditions might be used to set the handling limit margin as 0: a magnitude of the target yaw rate is beyond a certain threshold; a magnitude of the measured yaw rate is greater than a certain threshold; a driver's steering input exceeds a certain threshold; or, extreme conditions such as the vehicle's cornering acceleration is greater than 0.5 g, the vehicle's deceleration is greater than 0.7 g, the vehicle is driven at a speed beyond a threshold (e.g., 100 mph), etc.

In order to test the aforementioned handling limit margin computations and verify their effectiveness with respect to known driving conditions, a vehicle equipped with a research ESC system developed at Ford Motor Company was used to conduct vehicle testing.

Figure 2:
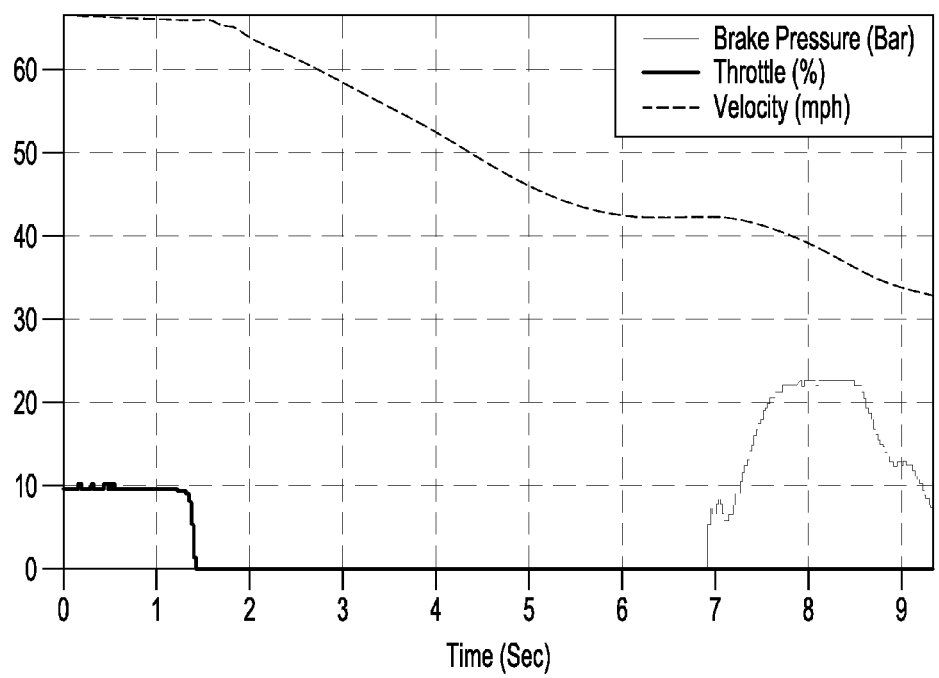
FIG. 2 is a plot of example vehicle speed, traction and braking profiles.
Figure 3A:
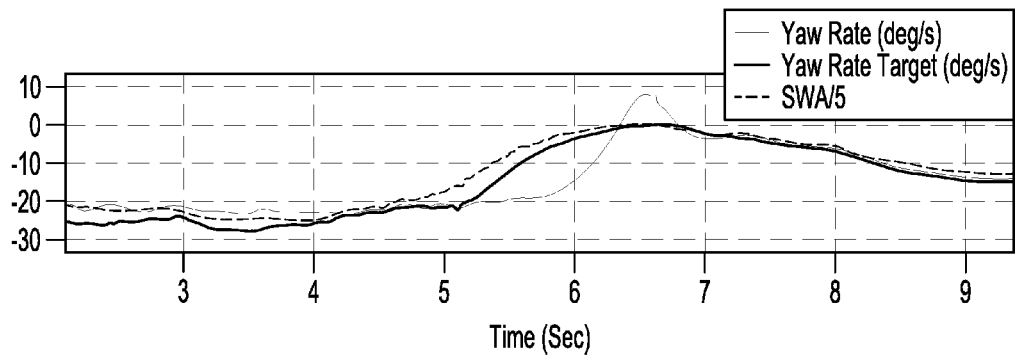
FIGS. 3A through 3C are plots of example vehicle motion states of yaw rate and sideslip angle.
Figure 3B:
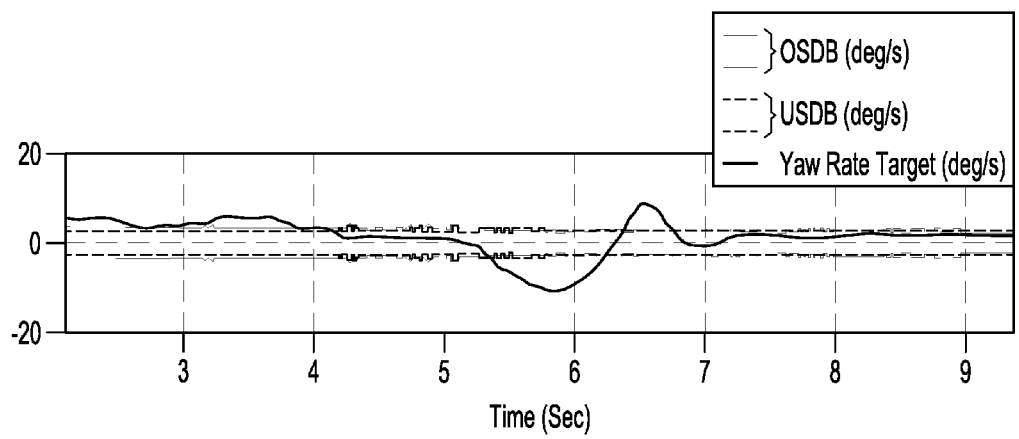
Figure 3C:
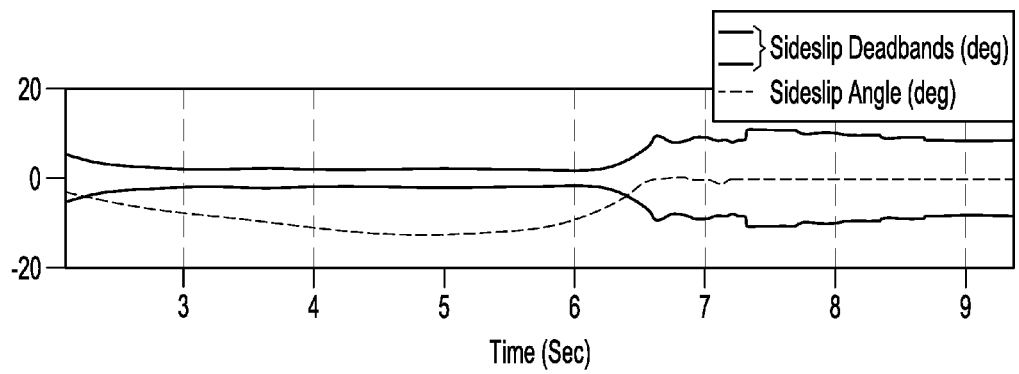
Figure 4A:
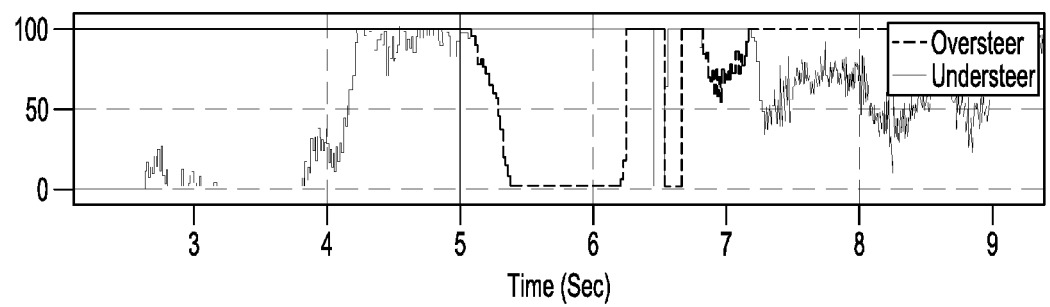
FIGS. 4A through 4C are plots of example yawing, longitudinal, and sidesliping handling limit margins.
Figure 4B:
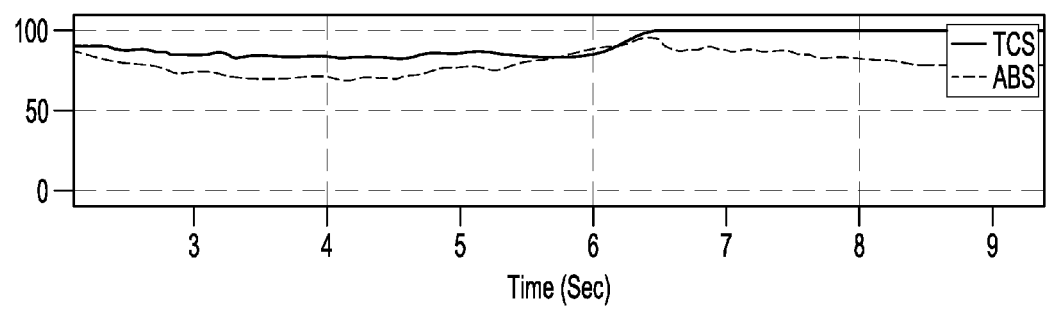
Figure 4C:
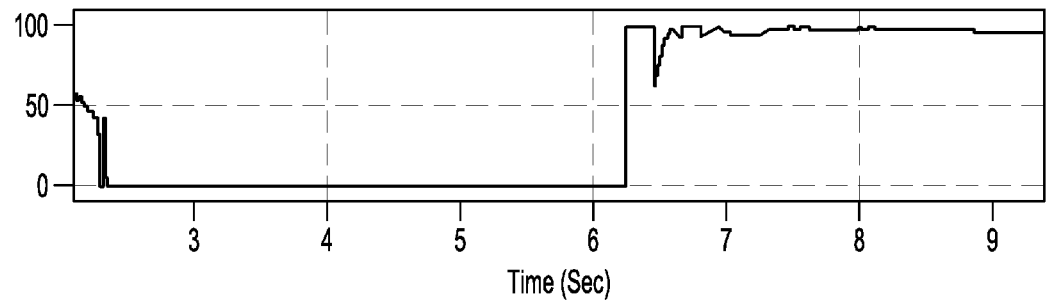

For the driving condition profiled by the vehicle speed, throttling, and braking depicted in FIG. 2, the measured and computed vehicle motion variables are shown in FIGS. 3A through 3C. The corresponding individual handling limit margins $h_{US}$, $h_{OS}$, $h_{TCS}$, $h_{ABS}$, and $h_{SSRA}$ are shown in FIGS. 4A through 4c. This test was conducted as a free form slalom on a snow pad with all ESC computations running. The brake pressure apply was turned off in order for the vehicle to approach the true limit handling condition.

Figure 5:
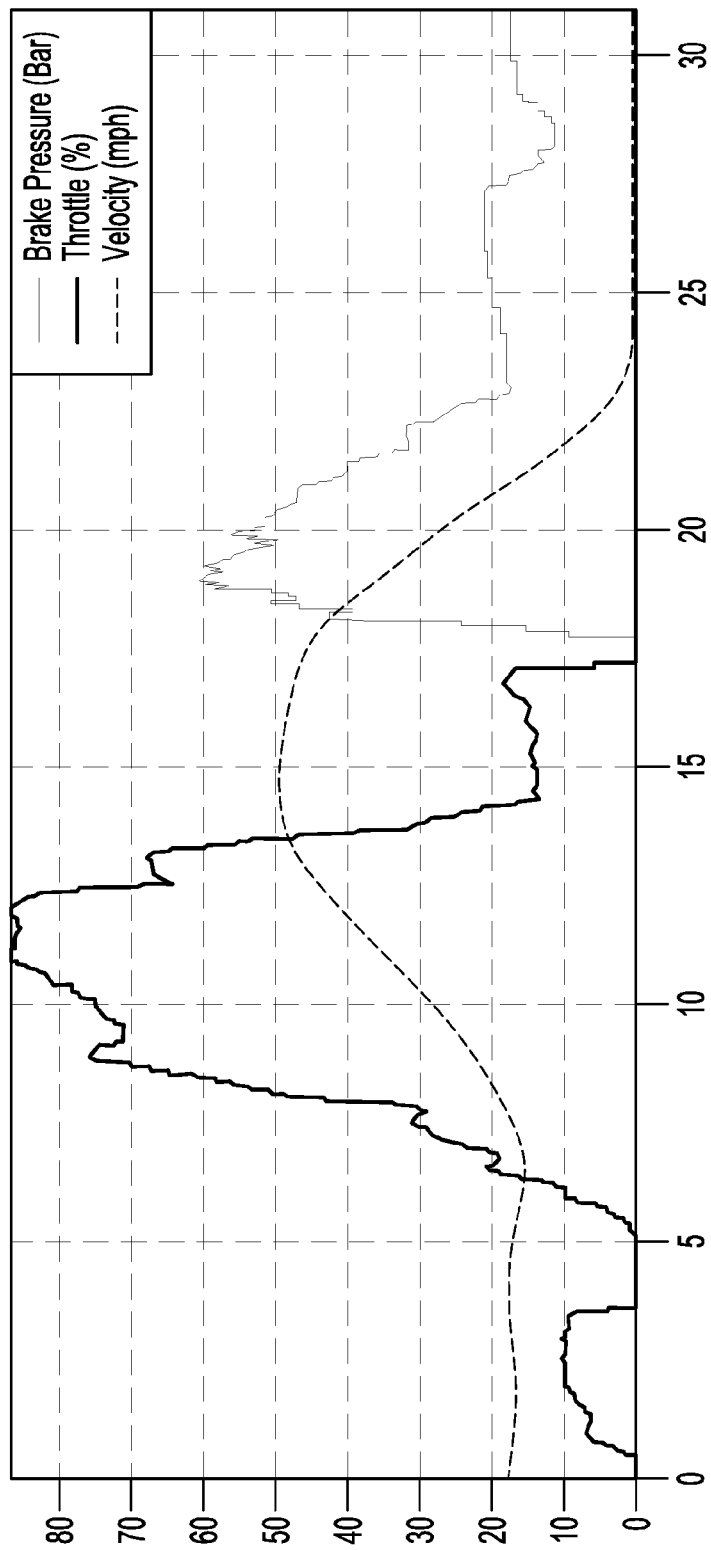
FIG. 5 is a plot of example vehicle speed, traction and braking profiles.
Figure 6A:
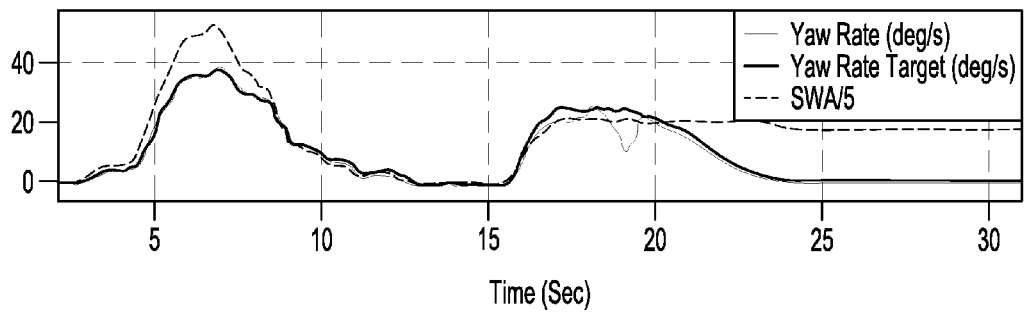
FIGS. 6A through 6C are plots of example vehicle motion states of yaw rate and sideslip angle.
Figure 6B:
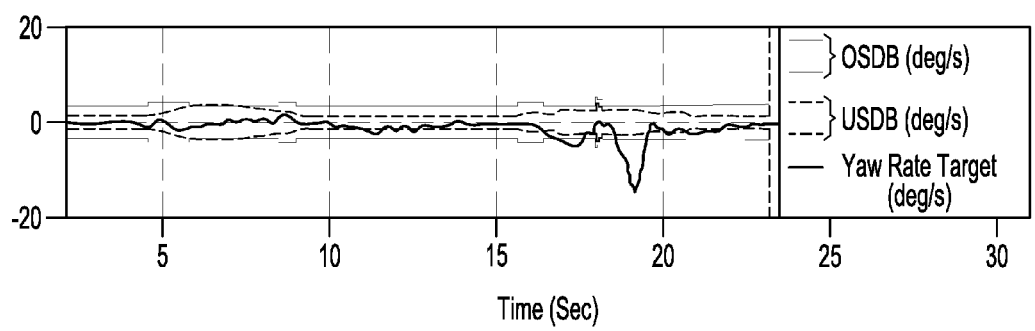
Figure 6C:
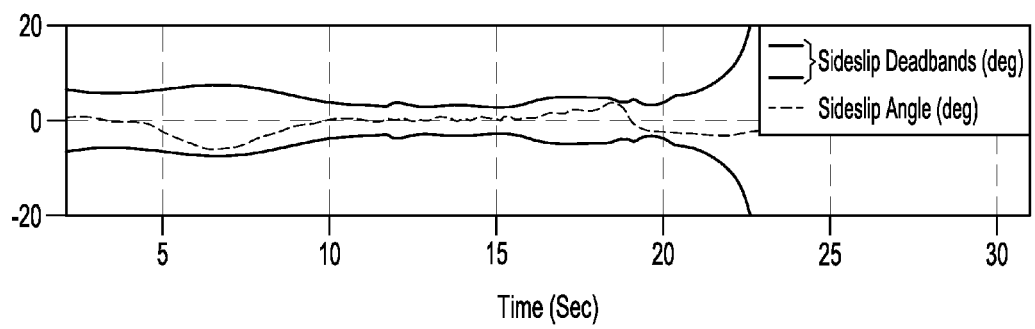
Figure 7A:
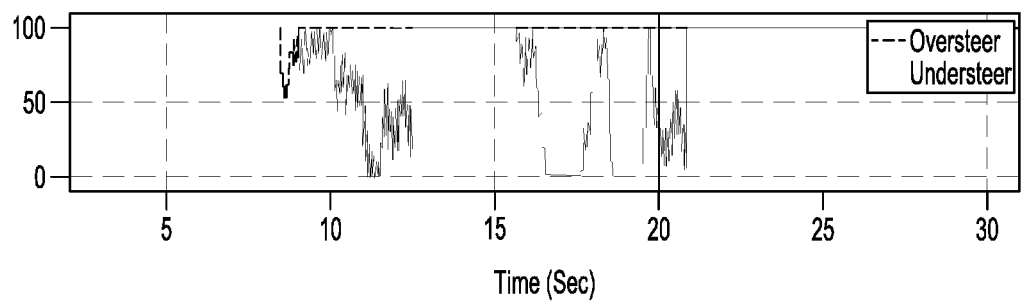
FIGS. 7A through 7C are plots of example yawing, longitudinal, and sidesliping handling limit margins.
Figure 7B:
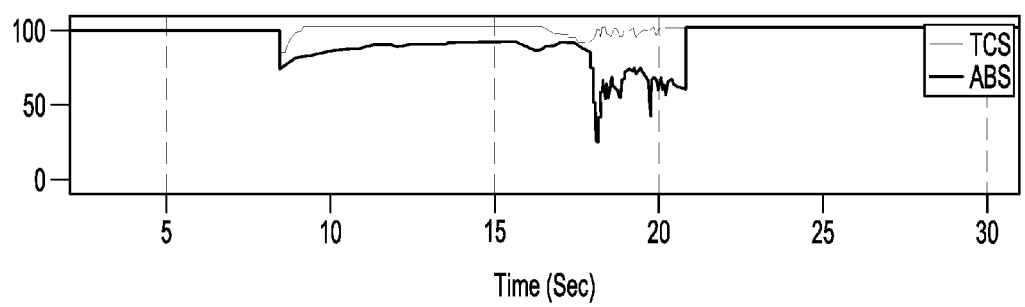
Figure 7C:
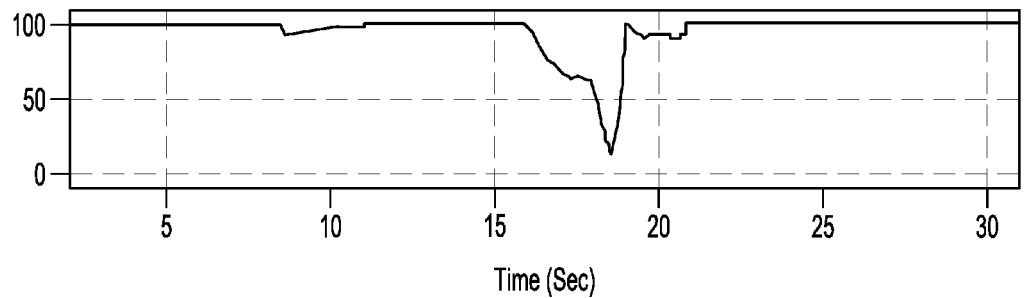

For another test, the vehicle was driven on a road surface with high friction level. The vehicle speed, traction and braking profiles for this test are depicted in FIG. 5. The vehicle motion states are shown in FIGS. 6A through 6C. The corresponding individual handling limit margins $h_{US}$, $h_{OS}$, $h_{TCS}$, $h_{ABS}$, and $h_{SSRA}$ are shown in FIGS. 7A and 7B.

An envelope variable of all the individual handling limit margins is defined as $$h_{env} = \min\{h_{OS}, h_{US}, h_{TCS}, h_{ABS}, h_{SSRA}\} \quad (10)$$

Considering that sudden changes in the envelope handling limit margin might be due to signal noises, a low-pass filter F(z) is used to smooth $h_{env}$ so as to obtain the final handling limit margin $$h = F(z) h_{env} \quad (11)$$

Figure 9A:
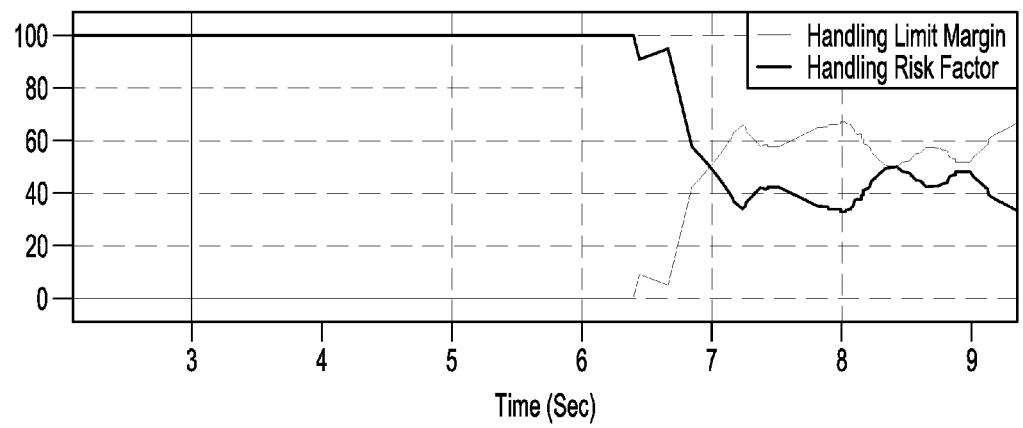
FIGS. 9A, 10A and 11A are plots of example final handling limit margins and risk.
Figure 10A:
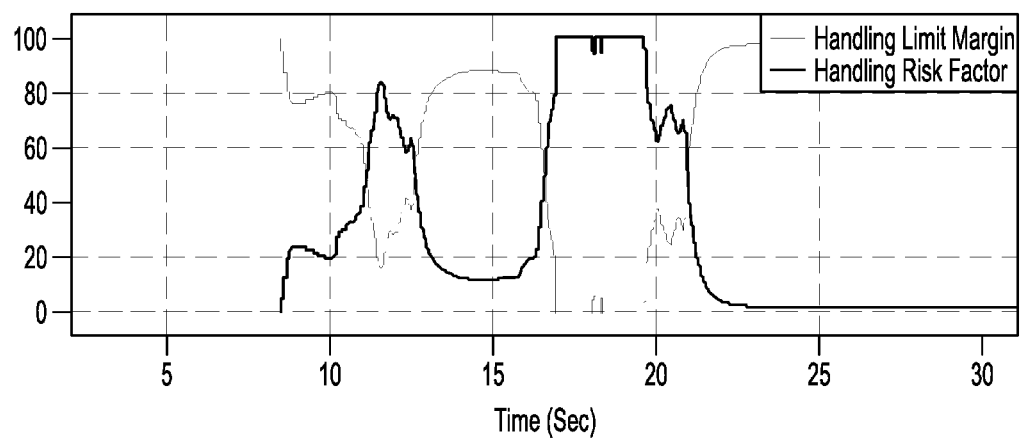

For the vehicle test data shown on FIG. 2 and FIGS. 3A through 3C, the final handling limit margin is depicted in FIG. 9A, while for the vehicle test data shown on FIG. 5 and FIGS. 6A through 6C, the final handling limit margin is depicted in FIG. 10A.

IV. Handling Limit Driving Style Characterization

In this section, we use the final handling limit margin computed in (11) to characterize vehicle handling related driving conditions and driving style. We introduce the concept of a Handling Risk Factor (HRF) as the measure of how a driving condition is related to the handling limit. The handling risk factor r is defined as the complement of the final handling limit margin h, i.e., $$r = 1 - h \quad (12)$$

The handling risk factor is minimal (r=0) when the final handling limit margin h is maximal (h=1) and vice versa. The HRF may be further used to develop a probabilistic model describing different categories of driving styles which are reflected by the current driving conditions with respect to the handling limit.

Generally speaking, a cautious driver usually drives without frequent aggressiveness, i.e., fast changes of steering, speed and acceleration. Hence, it is reasonable to characterize a cautious driver as one who constantly avoids using extreme driving inputs and getting close to the maximal handling risk. An average driver likely exhibits a higher level of HRF than a cautious driver. An expert driver might be more skilful in controlling the vehicle, i.e., he can drive with a relatively high level of HRF for a long duration without having the vehicle pass the maximal handling limit. A reckless driver exhibits a careless handling behavior which is unpredictable and could induce fast changes. The reckless driver is expected to drive with a handling risk factor that might approach the maximum (r=1) very briefly from time to time, thus causing frequent triggering of the related safety systems (e.g., ABS, TCS, ESC).

Figure 8:
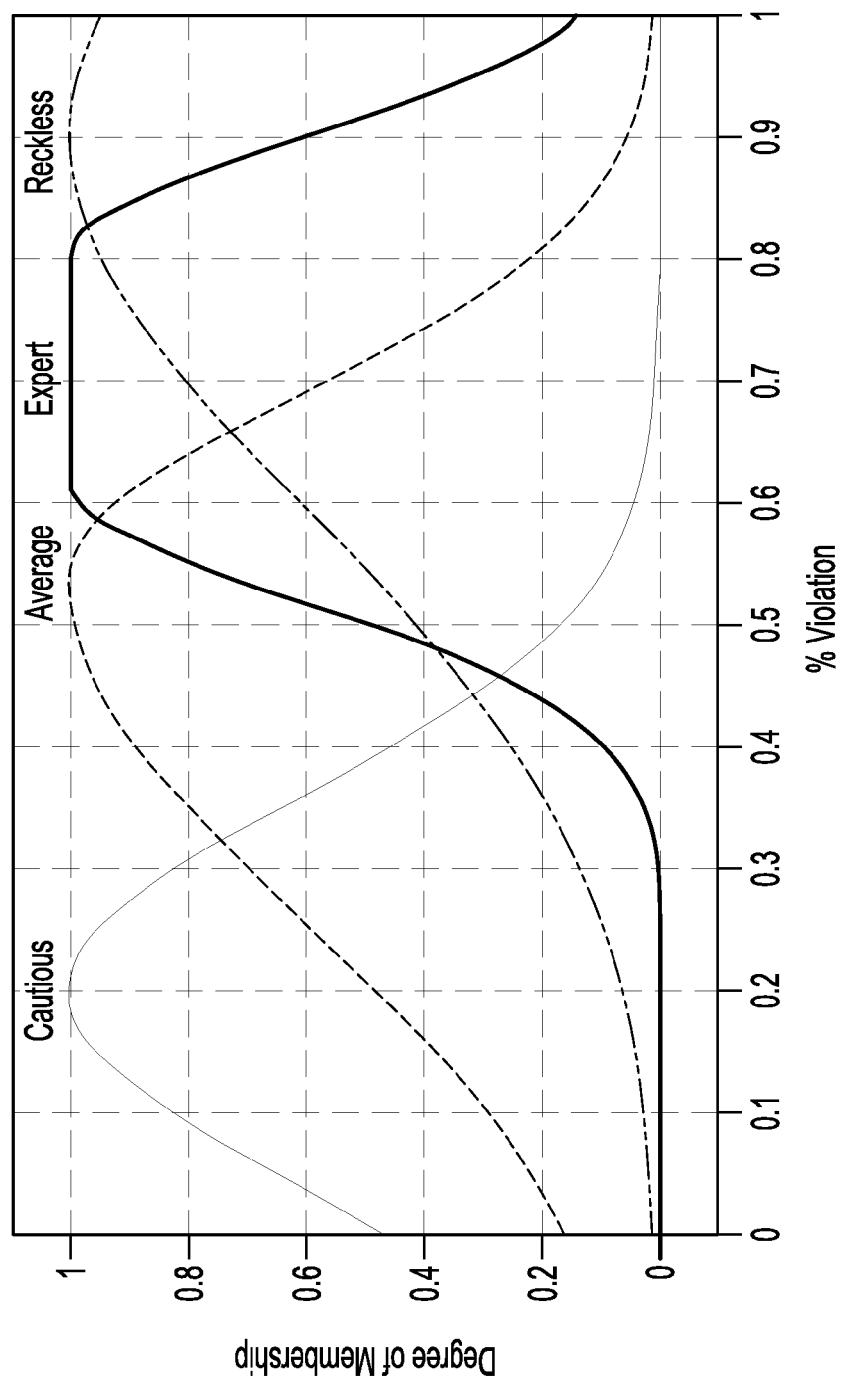
FIG. 8 is a plot of example membership functions characterizing four driver categories based on handling risk factor.

Notice that the difference between the expert driver and the reckless driver is that the former can hold a driving condition at a relatively high HRF level for long duration, while the latter can only hold at the similar level for a short duration before causing the vehicle to pass the maximal handling limit due to the driver's poor control capability. Since the handling risk factor ranges defining, for example, cautious, average, expert and reckless driving behavior (with respect to the limit handling conditions) may not be well defined, we use fuzzy subsets to quantify the four categories of drivers. We further evaluate those categories probabilistically based on a specific driver style. The fuzzy subsets associated with the categories of cautious, average, expert and reckless drivers may be described by the following membership functions $$\mu_c(r), \mu_e(r), \mu_a(r), \mu_r(r)$$

defined over the HRF universe [0, 1]. FIG. 8 shows the relationship between the degrees of membership for each of those categories and the HRF.

The membership functions in FIG. 8 can be assigned to any event that is represented by a specific HRF with value $r_k$ using a four dimensional vector $$D_k = [\mu_c(r_k) \mu_e(r_k) \mu_a(r_k) \mu_r(r_k)]^T$$

of its degree of membership to each of the four example categories: cautious, average, expert and reckless. For example, a HRF value $r_k$=0.4 (corresponding to handling limit margin value $h_k$=0.6) will translate to the degrees of membership to the cautious, average, expert and reckless categories $$\mu_c(0.4)=0.46, \mu_e(0.4)=0.85$$

$$\mu_a(0.4)=0.09, \mu_r(0.4)=0.22$$

The membership grades encode the possibilities that the event characterized by a HRF with value r=0.4 (or the handling limit margin h=0.6) might be associated with any of the four example partitions. The vector of membership values $d_k$ makes the association between a single driving event and the possible driver characterization with respect to the HRF of that event. In order to characterize the long term behavior of the driver, we need a probabilistic interpretation of the possibilities that are generated by multiple events. By adding the membership values for each event, we essentially aggregate the overall possibilities that a specific driver can be categorized as cautious, average, expert and reckless, i.e., the vector $$d^* = \sum_{k=1}^{N} [\mu_c(r_k)\mu_e(r_k)\mu_r(r_k)]^T \tag{13}$$

where N is the number of samples. The aggregated possibilities can be considered as frequencies (sometimes referred to as fuzzy frequencies) since they reveal how frequently and to what degree the HRFs for the multiple events can be cascaded to the four example categories. The alternative to aggregating the possibilities, i.e., adding the membership functions, is to add 1 if the specific membership grade $\mu_i(r_k), i\in\{c,a,e,r\}$ is greater than a prescribed threshold value, e.g., 0.8, or 0 otherwise, resulting in calculating the conventional frequency of the four example categories. From the aggregated possibilities, we can calculate the probabilities of the cautious, average, expert and reckless driver style $$p_i = d_i^* \left( \sum_{j\in\{c,a,e,r\}} d_j^* \right)^{-1} \tag{14}$$

where $i\in\{c,a,e,r\}$. The probabilities are calculated from the aggregated possibilities (fuzzy frequencies) and can be considered fuzzy probabilities. The reason for the fuzziness here is the lack of certainty in characterizing the relationship between the four example categories and the HRF. For the special case of crisply defined categories (represented by intervals rather than fuzzy subsets), the possibilities transform to Boolean values, their aggregated values become frequencies, and consequently the fuzzy probabilities are translated to conventional probabilities.

The most likely driver category i* is the one that is characterized with the highest probability, i.e., $$i^* = \arg\max_{i\in\{c,a,e,r\}}(p_i) \tag{15}$$

The frequencies based calculation of the probabilities can be expressed in terms of the average frequencies $$p_i = d_i^* \Big/ N \left( \sum_{j\in\{c,a,e,r\}} d_j^*/N \right)^{-1} \tag{16}$$

Alternatively, it can be expressed through the exponentially weighted average frequencies where the higher weights are assigned to the possibilities that are associated with the most recent events. Numerically, the process of generating a weighted average with higher weights corresponding to the recent observation can be accomplished by applying a low pass filter implementing the exponential smoothing algorithm in the time domain $$d_{new}^* = (1-\alpha)d_{old}^* + \alpha d_k = d_{old}^* + \alpha(d_k - d_{old}^*) \tag{17}$$

where the constant forgetting factor $0<\alpha\leq 1$ controls the rate of updating the mean d* by assigning a set of exponentially decreasing weights to the older observations. For a constant forgetting factor $\alpha$, expression (17) recursively generates a vector of positive weights $$W=[(1-\alpha)^k \alpha (1-\alpha)^{k-1} \alpha (1-\alpha)^{k-2} \ldots \alpha] \tag{18}$$

with a unit sum. Vector W delineates a weighted average type aggregating operator with exponentially decreasing weights that are parameterized by the forgetting factor $\alpha$. Parameter $\alpha$ defines the memory depth (the length of the moving window) of the weighted averaging aggregating operator. Therefore, the filtered value d* of the membership grade vector in (17) represents the weighted averages of the individual possibilities over the weights W. Since all of the aggregated possibilities are calculated over the same moving window of length $K_\alpha=1/\alpha$, we can consider them as representations of the frequencies of the associations with each of the four concepts. Weighted average (17) is calculated over the events with indexes belonging to a soft interval $$s\in\{k-K_\alpha+1, k] \tag{19}$$

where symbol { indicates a soft lower bound that includes values with lower indexes than $(k-K_\alpha)$ with relatively low contribution. Consequently, the aggregated possibilities that form the vector d* can be converted to probabilities according to expression (14).

In certain embodiments, α may be selectable so that a characterization for a desired period of time is achieved. For example, a user may supply input related to α such that every half hour, a characterization is made. Other scenarios are also possible.

Figure 9B:
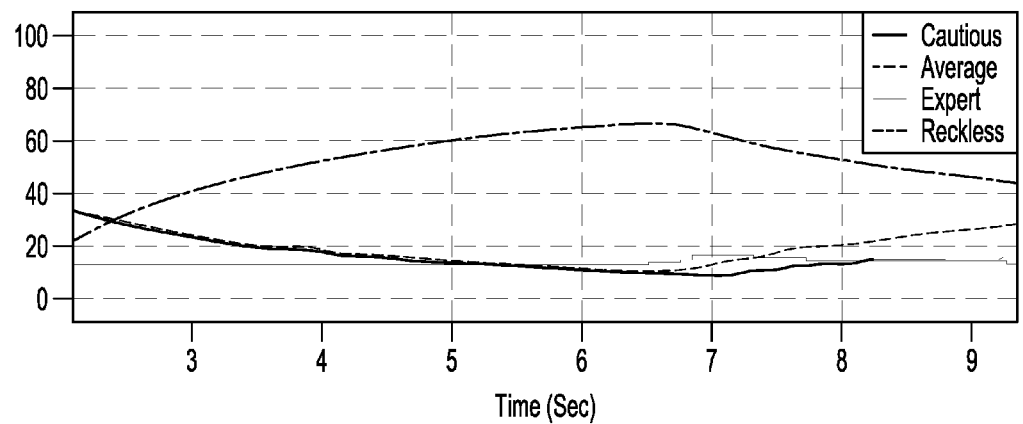
FIGS. 9B, 10B and 11B are plots of example probabilities of driver style.
Figure 10B:
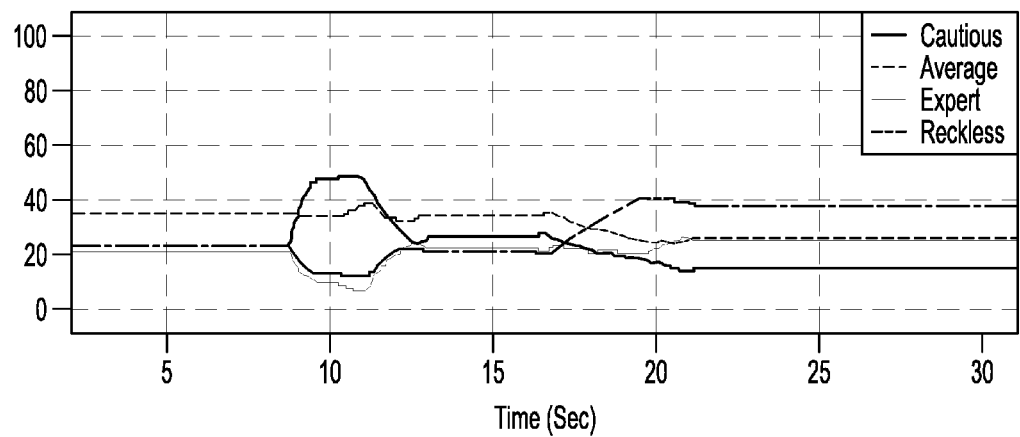

For the vehicle testing depicted by FIGS. 2, 3A through 3C and 4A through 4C, the individual $p_i$'s are shown on FIG. 9B indicating that for most of the driving, the driver exhibited a reckless driving behavior, which is consistent with the large value of the sideslip angle in FIG. 3C (peak magnitude of the sideslip angle exceeds 10 degrees). For vehicle testing depicted by FIGS. 5 through 7C, the individual $p_i$'s are shown in FIG. 10B, indicating that the driver initially exhibited an average driver behavior and then transitioned to a reckless driver behavior.

The calculated probabilities define the most likely HRF based characterization of a driver for the time window that is specified by the forgetting factor α. By modifying the moving window, we can learn and summarize the long and short term characterization for a specific driver based on the HRF.

In order to predict the impact of the changes in HRF on the driver's characterization, we introduce the notion of transitional probabilities. The Markov model P probabilistically describes the set of transitions between the current and the predicted value of the driver category:

$$p_j(k+1) \rightarrow$$

$$p_i(k) \begin{matrix} p_{11} & p_{12} & p_{13} & p_{14} \\ p_{21} & p_{22} & p_{23} & p_{24} \\ p_{31} & p_{32} & p_{33} & p_{34} \\ p_{41} & p_{42} & p_{43} & p_{44} \end{matrix}$$

where $p_{ij}$ is the probability of switching from category i at time k to category j at time k+1, and $p_{ii}=\max(p_i)$ is the probability that is associated with the dominating category i at time k, $i,j \in \{c,a,e,r\}$. The transitional probabilities $p_{ij}$ are derived from the transitional aggregated possibilities that are updated only if i=arg max $(p_l)$ at time k and j=arg max $(p_l)$, $l \in \{c,a,e,r\}$ $$d^*_{ij,new} = \begin{cases} (1-\alpha)d^*_{ij,old} + \alpha d_{i,k} & \text{if } j = \arg\max_{l \in \{c,a,e,r\}}(p_l) \\ (1-\alpha)d^*_{ij,old} & \text{otherwise} \end{cases} \quad (20)$$

The transitional probabilities are then calculated by converting the aggregated transitional possibilities to the probabilities. The maximal transitional probability $p_{ij}$ determines the transition from category i to category j as the most likely transition.

Figure 11A:
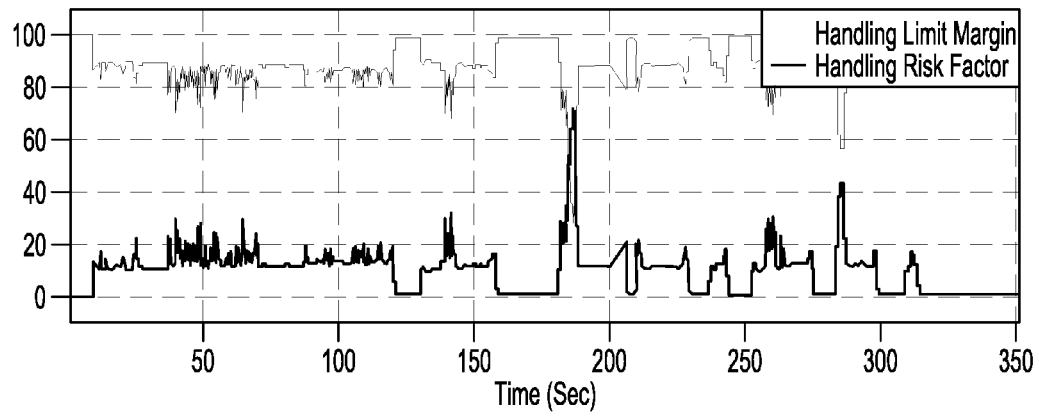
Figure 11B:
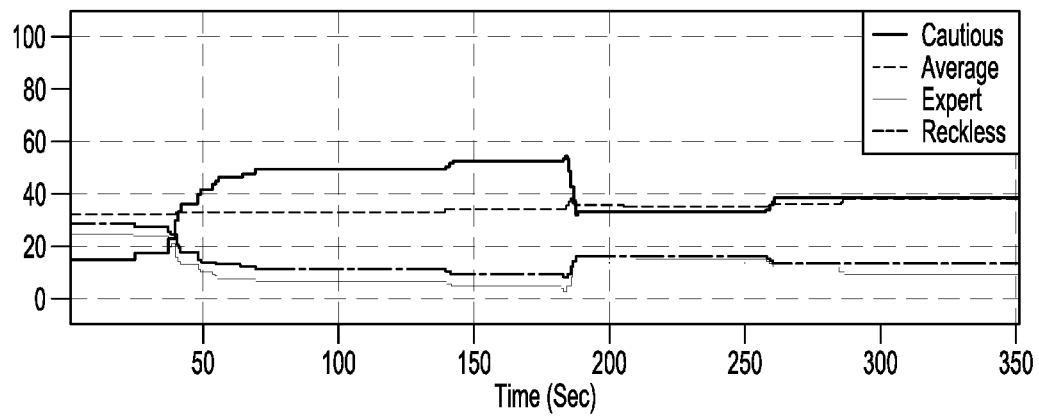

FIGS. 11A and 11B use a driving vehicle test to verify long term driving behavior characterization. The driver generally shows a cautious driving style (which could be a novice, average or expert driver). At around 190 seconds, the vehicle was turned with some degree of aggressiveness which can be seen from the peak at the HRF plot, and the driving style transitioned to the average category. Since no major HRF events were further identified, this category was carried out for the rest of the driving cycle in conjunction with the concept of the long term characterization.

As mentioned above, various audible and/or visual warnings may be activated to alert a driver about the handling limit margin. The margin thresholds that define whether (and/or what type) of warning is to be issued may be altered (or suspended) based on the driver characterization. For example, if it is determined that the driver is an expert driver, the warning threshold may be reduced from $h_x \leq 10\%$ to $h_x \leq 2\%$, or the warnings regarding the handling limit margin may be suspended (an expert driver may not need the warnings).

V. Unsupervised Driving Style Characterization

During a normal driving maneuver, a driver's long term longitudinal vehicle control may be used to determine driving behavior regardless of the vehicle's dynamic response. For instance, a driver may exhibit a specific longitudinal control pattern during driving on a highway for a long period of time. His pattern of acceleration pedal activation can be smooth or abrupt even in the absence of emergency conditions. The variability of the pedal and its rate change can be used to differentiate between smooth and abrupt application. Such a smooth or abrupt application exhibits strong correlation with fuel economy and acceleration performance when driving conditions are unconstrained. Identifying such driving behaviors can be used, for example, to implement a fuel economy advisor.

Anomaly detection can be used to estimate major changes in the overall variability of the control actions indicating changes in corresponding behaviors. Anomaly detection is a technique that puts a major emphasis on the continuous monitoring, machine learning, and unsupervised classification to identify a trend of departure from a normal behavior and predict potential significant change. The determinant of the covariance matrix of the population of a driver's actions may be used as a measure of the generalized variance (spread) of the population, and hence as an indicator for a change in the driver's behavior.

The feature space of driving torque request $\tau_d$ and its derivative is spanned by the vector $y=[\tau_d \dot{\tau}_d]$. The determinant D of the covariance matrix of the population can be recursively calculated as $$D_{k+1}=(1-\alpha)^{k-1}D_k(1-\alpha+(y_k-v_k)Q_k(y_k-v_k)^T) \quad (21)$$

with $$v_{k+1}=(1-\alpha)v_k+\alpha y_k$$

$$Q_{k+1}=(I-G_k(y_k-V_k))Q_k(1-\alpha)^{-1}$$

$$G_{k+1}=Q_k(y_k-v_k)^T\alpha(1-\alpha+\alpha(y_k-v_k)Q_k(y_k-v_k)^T)^{-1} \quad (22)$$

where $v_k$ is a filtered version of $y_k$, $Q_k$ is the estimated inverse covariance matrix, and α is a constant which reflects the forgetting factor related to the filter memory depth.

$D_k$ thus computed in (21) has initial means and standard deviations for abrupt and smooth type behaviors. The instantaneous behavior is classified as abrupt if its value is higher than a control limit $l_{abrupt}$ and is classified as smooth if its value is lower than a control limit $u_{smooth}$. $l_{abrupt}$ and $u_{smooth}$ are defined as $l_{abrupt}=\mu_{abrupt}-3\sigma_{abrupt}$, $u_{smooth}=\mu_{smooth}+3\sigma_{smooth}$ where $\mu_{abrupt}$ and $\sigma_{abrupt}$ are the mean and standard deviation of the abrupt behavior class. $\mu_{smooth}$ and $\sigma_{smooth}$ are similarly defined for the smooth behavior class. If the current behavior is classified as either abrupt or smooth, the corresponding mean and standard deviation of the matching behavior are recursively updated $$w_{k+1}=(1-\beta)w_k+\beta D_{k+1}$$

$$H_{k+1}=(1-\beta)H_k+(\beta-\beta^2)(D_{k+1}-w_k)^T(D_{k+1}-w_k)$$

$$\sigma_{k+1}=(H_{k+1})^{1/2} \quad (23)$$

where w and H are the estimated mean and variance, and β is another forgetting factor.

Figure 12:
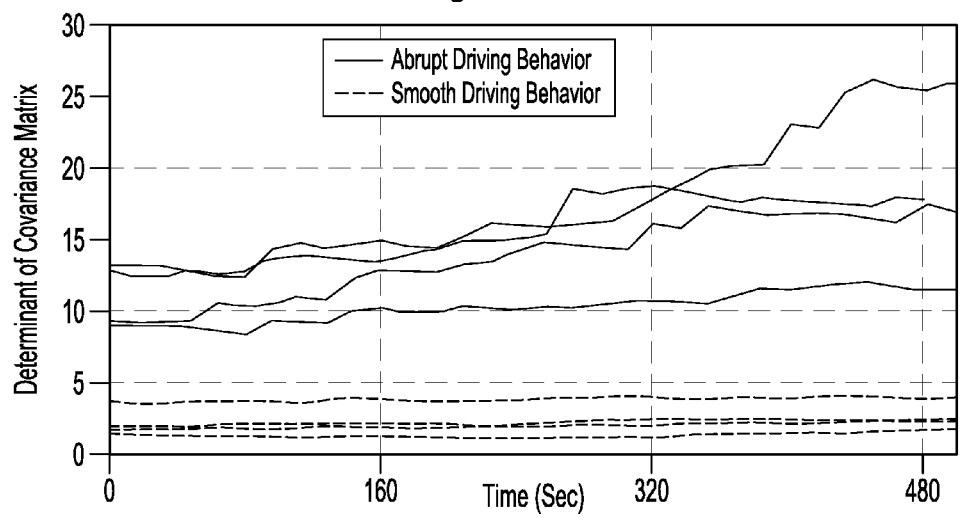
FIG. 12 is a plot of example determinants of smooth and abrupt driving behaviors.

FIG. 12 shows the determinant of the covariance matrix from the vector of acceleration pedal position and its rate change for 8 runs of vehicle tests. The 4 runs with solid lines of determinant were for abrupt acceleration pedal applications. These determinants show a large value, for example, greater than 7. The 4 runs with dotted lines of determinant were for smooth acceleration pedal applications. These determinants show a small value, for example, less than 4. Hence, the size of the determinant reveals the unique informative patterns which can be used to distinguish smooth driving behavior from abrupt driving behavior.

Since interactions between the driver and the driving environment include frequent vehicle stops with varied durations, suspension of the continual updating may be required to prevent numerical problems during recursive computation. The following suspension conditions may be used: (i) If vehicle speed is less than 1 mph, vehicle speed and acceleration related recursive calculations are suspended. (ii) If the accelerator pedal position is less than 1%, pedal related recursive calculations are suspended.

Although the above deviation focuses on the acceleration pedal, it can be easily applied to the braking case. Since sudden aggressive braking can happen during emergency situations (which are not necessarily indicative of the driver's general behavior), quasi-steady state driving where braking is not at its extreme may be used for computational screening.

During transient acceleration and deceleration, certain wheels of the vehicle may experience large longitudinal slip, and the tire longitudinal forces of those wheels may reach their peak values. Such conditions can be identified through monitoring the rotational motion of the individual wheels in relation to the vehicle's travel velocity, and consequently the driver behavior during transient maneuvers can be determined as discussed above.

VI. Semi-Supervised Driving Style Characterization

All driver inputs may not be accessible by electronic control systems. Certain variables, however, may construct an input-output pair that may be used to deduce driver control structure. For example, during a car-following maneuver, the relative distance between the leading and following car and the driver's braking and throttle requests are usually well coordinated. Here we consider using a Tagaki-Sugeno (TS) model to relate the variance of the driver's braking and throttling commands to the relative range and velocity between the leading and following car.

A fuzzy system may utilize the signal conditioned mean driving headway (gap-time) relative to the other vehicle, as well as the standard deviation of the rate changes of the accelerator pedal and brake pedal to determine whether the driver is aggressive or cautious. The driver index value from fuzzy computation and rule evaluation may determine the aggressiveness of the driver based on car following, vehicle speed and the driver's control actions on acceleration and deceleration.

Figure 13A:
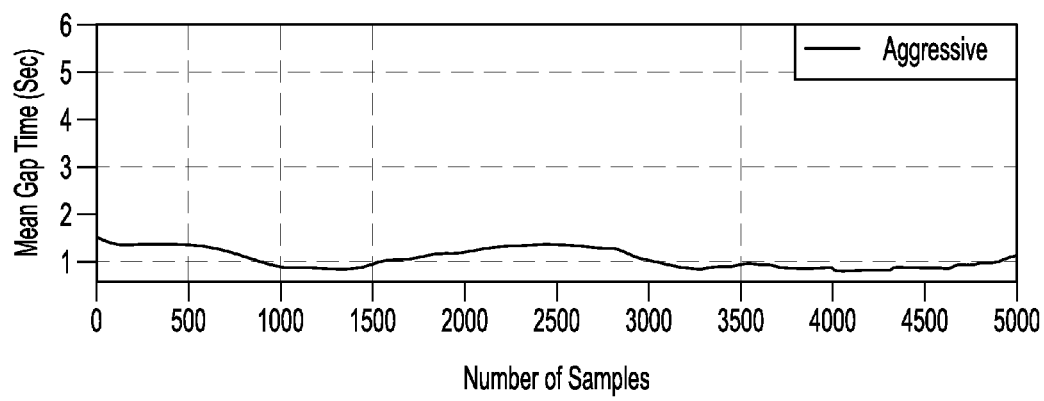
FIGS. 13A and 13B are plots of example mean gap times for aggressive and cautious driving respectively.
Figure 13B:
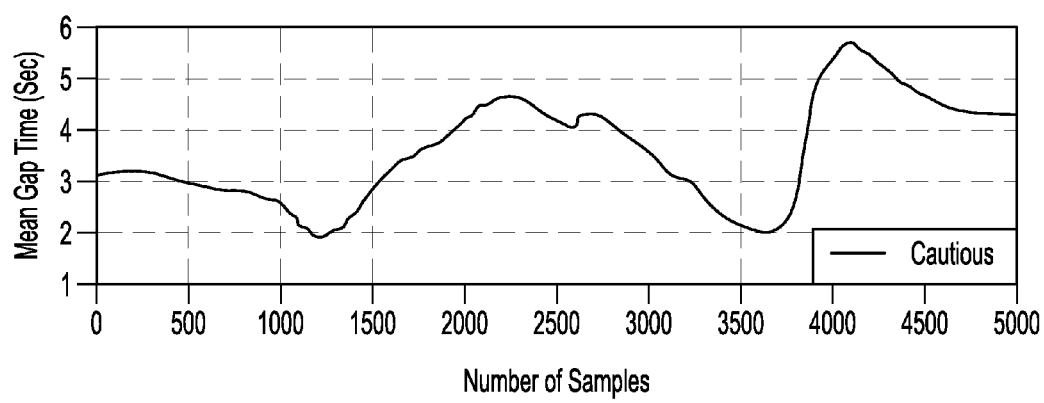

For real-time vehicle implementation, the recursive estimation of the mean and variance of a variable of interest is applied. The signal conditioned average mean gap-time at sample time k can be computed as $$g_k = g_{k-1} + \alpha(\Delta s_k / v_{fk} - g_{k-1}) \tag{24}$$

where $\Delta s_k$ is the relative distance between the leading and following vehicle, and $v_{fk}$ is the velocity of the following vehicle. $\alpha$ is a filter coefficient similar to the one used in (22). FIGS. 13A and 13B show the mean gap-times computed from two runs of vehicle testing: one for aggressive driving and the other for cautious driving.

Figure 14A:
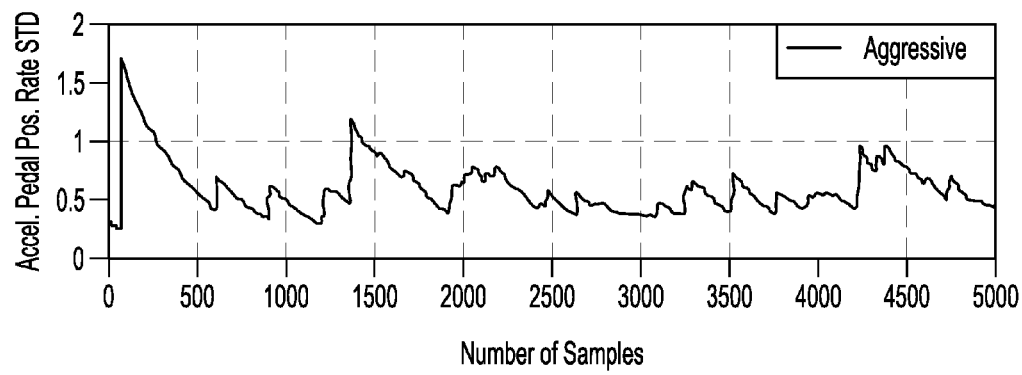
FIGS. 14A and 14B are plots of example standard deviations of accelerator pedal rate for aggressive and cautious driving respectively.
Figure 14B:
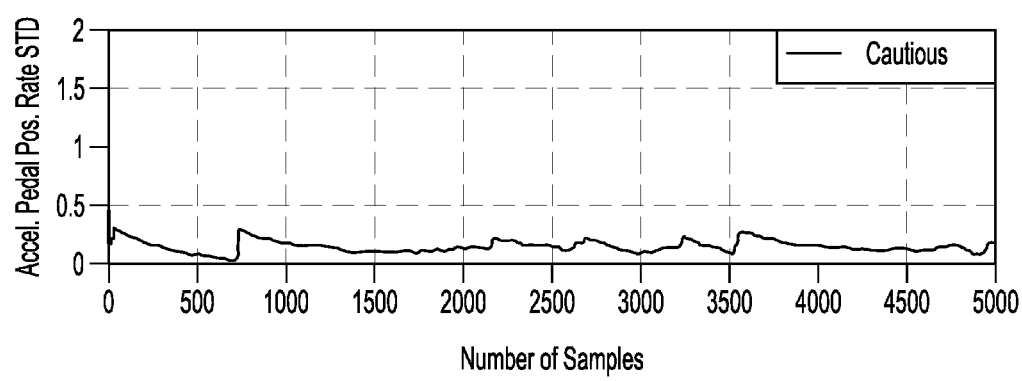

The acceleration pedal rate mean can be computed as $$\bar{\rho}_k = \bar{\rho}_{k-1} + \alpha((\rho_k - \rho_{k-1})/\Delta T - \bar{\rho}_{k-1}) \tag{25}$$

where $\bar{\rho}$ is the acceleration pedal mean and $\Delta T$ is the sample time. The corresponding variance can be computed as $$v_k \alpha v_{k-1} + (1-\alpha)(\rho_k - \bar{\rho}_k)^2 \tag{26}$$

and the standard deviation is obtained from the square-root of the variance. FIGS. 14A and 14B show the standard deviations of two runs of test data for aggressive and cautious driving.

Figure 15A:
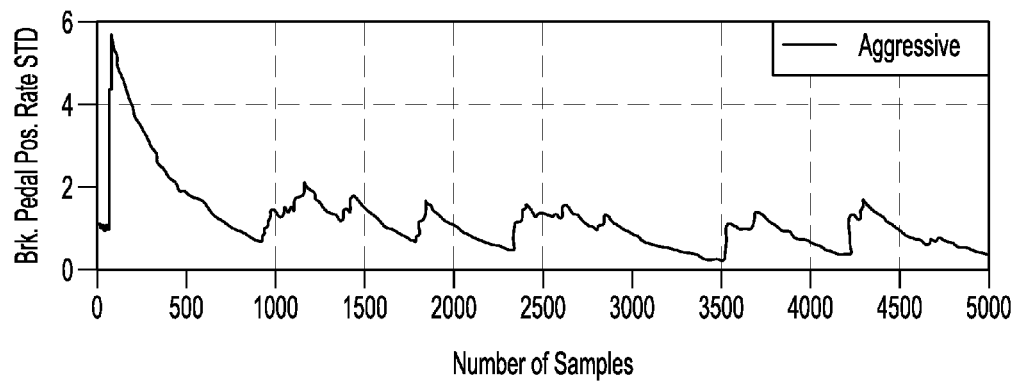
FIGS. 15A and 15B are plots of example standard deviations of brake pedal rate for aggressive and cautious driving respectively.
Figure 15B:
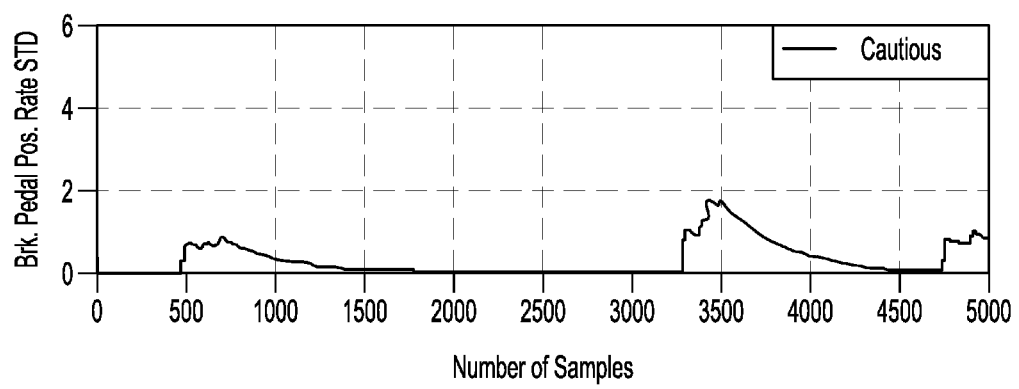

Similar to (25) and (26), the mean and variance of the brake pedal rate change can be computed. FIGS. 15A and 15B show the standard deviations of two runs of test data for aggressive and cautious driving. The variables are first normalized before presenting them to the fuzzy inference system. The fuzzy sets and membership functions were determined for the features to transform the crisp inputs into fuzzy terms. The mean gap-time fuzzy set $G_s$ is defined by $$G_s = \{(g, \mu(g)) | g \in G\} \tag{27}$$

where $G$ is given by the bounded collection of gap-times g in the vehicle path. The gap-time membership function $\mu$ is chosen to be a Gaussian function.

A zero-order TS model was used to compute the driver index level. A normalized output scale from 0-1.0 represented the levels from cautious, to less aggressive, to aggressive driving behavior. The driver index is obtained from fuzzy computation and rule evaluation. Table 1 shows the rules used. Notice that a higher gap-time is relatively more safety conscious compared to a lower gap-time.

TABLE 1

Rules for driving behavior characterization

| If gap-time is | If accel pedal rate STD is | If brake pedal rate STD is | Then driver index is |
| --- | --- | --- | --- |
| Low | Low | Low | Less Aggressive |
| High | Low | Low | Cautious |
| Low | High | Low | Aggressive |
| Low | Low | High | Aggressive |
| Low | High | High | Aggressive |
| High | High | High | Less Aggressive |
| High | Low | High | Cautious |
| High | High | Low | Less Aggressive |

Figure 16A:
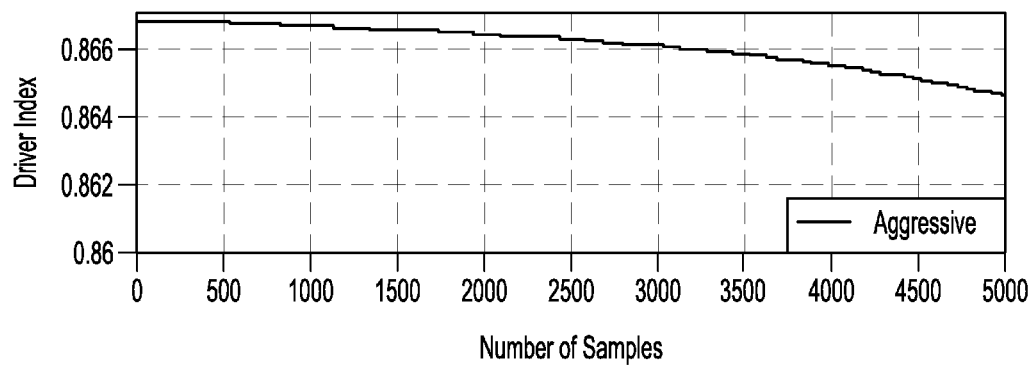
FIGS. 16A and 16B are plots of example driver indices for aggressive and cautious driving respectively.
Figure 16B:
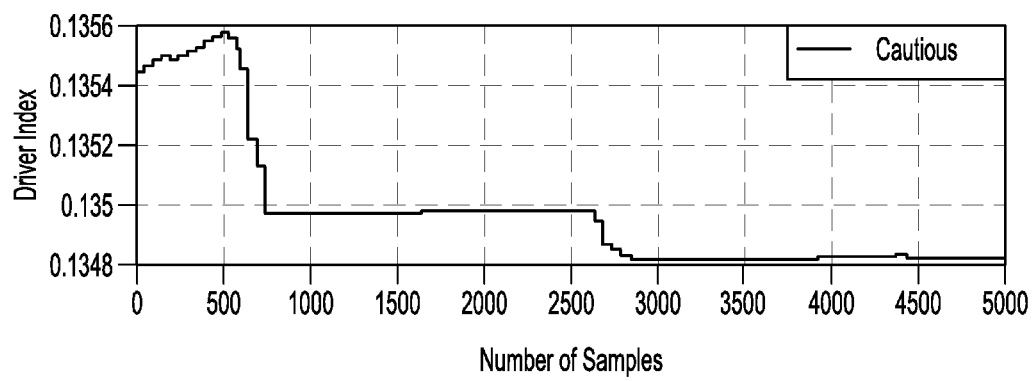

FIGS. 16A and 16B show the driver index computed from two runs of vehicle testing data: one for aggressive driving with a driver index greater than 0.8 and the other for cautious driving with a driver index less than 0.2.

VII. Supervised Driving Style Characterization

The car-following task requires the driver to maintain with the leading vehicle one of the following (i) a zero speed difference; (ii) a constant relative distance; and (iii) a constant relative gap-time defined by the division of the relative distance by the relative velocity.

A human driver may be modeled as a PD feedback controller. The closed loop system during a car following maneuver may be expressed as $$(\ddot{x}_f - \ddot{x}_l - \ddot{\bar{x}}_g) = -c_{cv}(\dot{x}_f - \dot{x}_l - \dot{\bar{x}}_g) - c_s(x_f - x_l - \bar{x}_g) \tag{28}$$

where $x_l$ and $x_f$ are the leading and the following vehicle travel distance and $\bar{x}_g$ is the gap offset reference. Due to the implementation of radar used in vehicles equipped with adaptive cruise control function, the relative distance and velocity are measured and defined as $$\Delta s = -x_f - x_{fi}, \Delta v = \dot{x}_l - \dot{x}_f \tag{29}$$

A vehicle equipped with stability controls has a longitudinal accelerometer with output $\alpha_x$, which measures $\ddot{x}_f$ (28) can be further expressed as $$\alpha_x = c_v(\Delta v - \bar{\dot{x}}_g) + c_s(\Delta s - \bar{x}_g) + (\ddot{x}_l - \bar{\ddot{x}}_g) \tag{30}$$

The unknown parameters $c_v$ and $c_s$ in (30) can be used to characterize a driver's control structure during a car following. Using the low-pass filtered $\Delta s$ and $\Delta v$ to replace the gap offset reference $\bar{x}_g$ and its derivative $\bar{\dot{x}}_g$, and considering the time delays, we have the following equations $$\alpha_{x_{k+i}} = c_v[\Delta s_k - \mu_k(\Delta s)] + c_s[\Delta v_k - \mu_k(\Delta v)] + w \tag{31}$$

$$\begin{bmatrix} \mu_k(\Delta s) \\ \mu_k(\Delta v) \end{bmatrix} = (1-\alpha) \begin{bmatrix} \mu_{k-1}(\Delta s) \\ \mu_{k-1}(\Delta v) \end{bmatrix} + \alpha \begin{bmatrix} \Delta s_k \\ \Delta v_k \end{bmatrix}$$

where subscript i in $\alpha_{x_{k+i}}$ reflects the time delay between the driver's braking/throttling actuation and the measured relative distance and velocity, and acceleration, $\alpha$ is a low-pass filter coefficient similar to the one used in (22), and w is a high frequency uncertain signal that may be treated as white noise. Using a conditional least square identification algorithm, $c_v$ and $c_s$ can be identified in real-time from (31). The response time $t_p$ and the damping ratio $\zeta$ of the driver-in-the-loop system can be related to $c_v$ and $c_s$ as $$t_p = 2\pi c_s / \sqrt{4c_s - c_v^2}, \zeta = c_v/2\sqrt{c_s} \tag{32}$$

which can be used to deduce the driver's driving behavior: (i) for a normal driver, it is desired that the transient response of the driver-in-the-loop system be fast (sufficiently small $t_p$, e.g., less than 0.5 s) and damped (sufficiently large $\zeta$); (ii) for an aged or driver with physical limitation, $t_p$ may be large; (iii) for an aggressive driver, $\zeta$ is likely to show a small value, such as one less than 0.5, and the system response is likely to exhibit excessive overshoot; (iv) for a cautious driver, $\zeta$ is likely to show a reasonably large value, such as one greater than 0.7.

A least-square parameter identification was implemented for calculating $c_v$ and $c_s$. Two runs of vehicle testing were conducted. In the $1^{st}$ run, the driver in the following car tried to use aggressive throttling and braking to achieve a constant relative gap-time between his vehicle and a leading vehicle, which led to larger range error $\Delta s_k - \mu_k(\Delta s)$. See, FIG. 17. The identified $c_v$ is around 0.2 and identified c, around 0.05. See, FIG. 18. The damping ratio thus computed from (32) showed a value less than 0.5, which is an indication of a light damping driver-in-the-loop system, hence corresponding to aggressive driving behavior.

Figure 17:
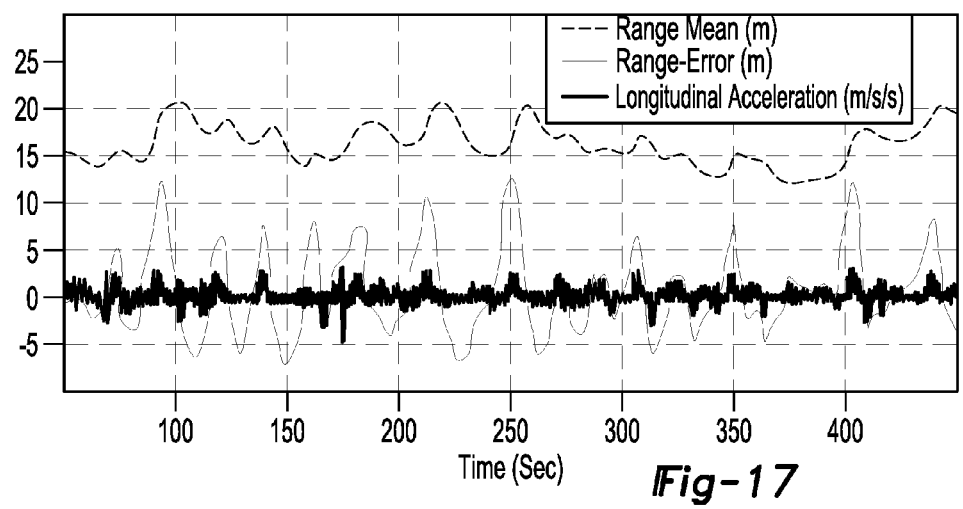
FIG. 17 is a plot of an example relative range, range-error and longitudinal acceleration between a leading and following car for aggressive driving.
Figure 18:
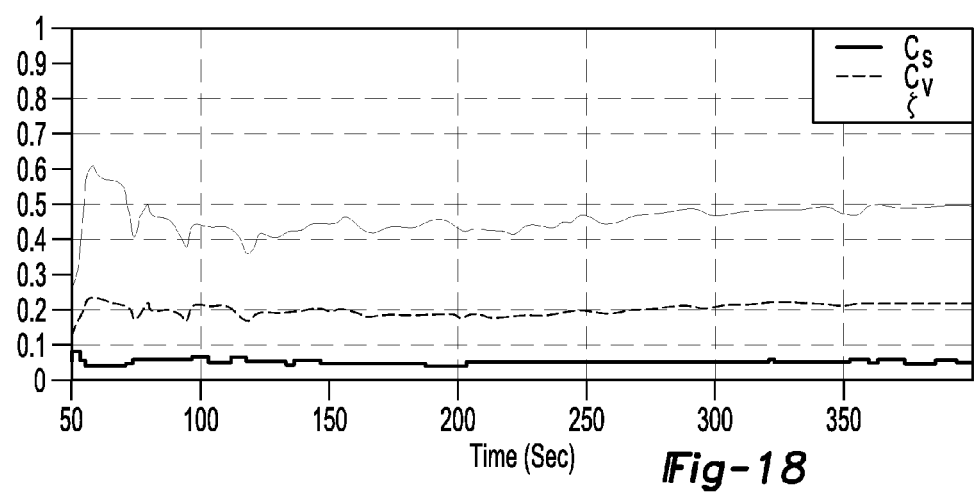
FIG. 18 is a plot of select example parameters characterizing the aggressive driving of FIG. 17.
Figure 19:
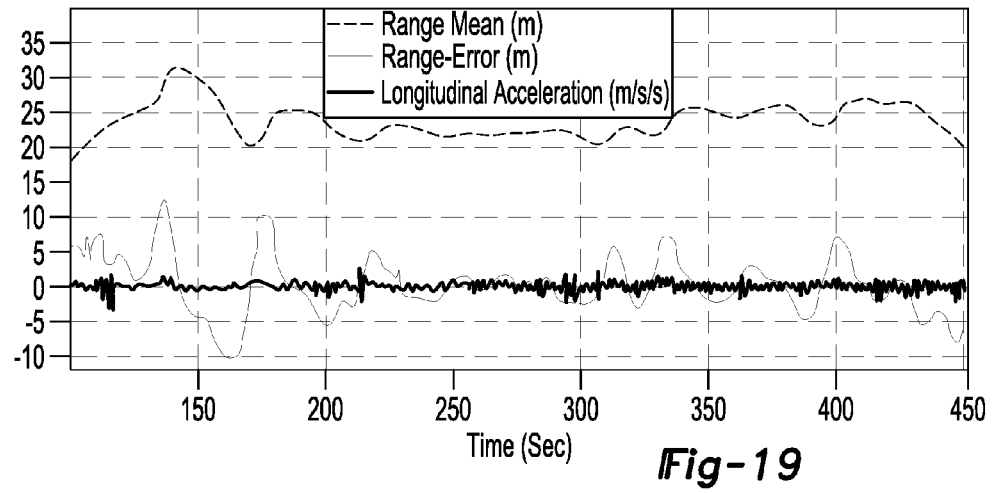
FIG. 19 is a plot of an example relative range, range-error and longitudinal acceleration between a leading and following car for cautious driving.
Figure 20:
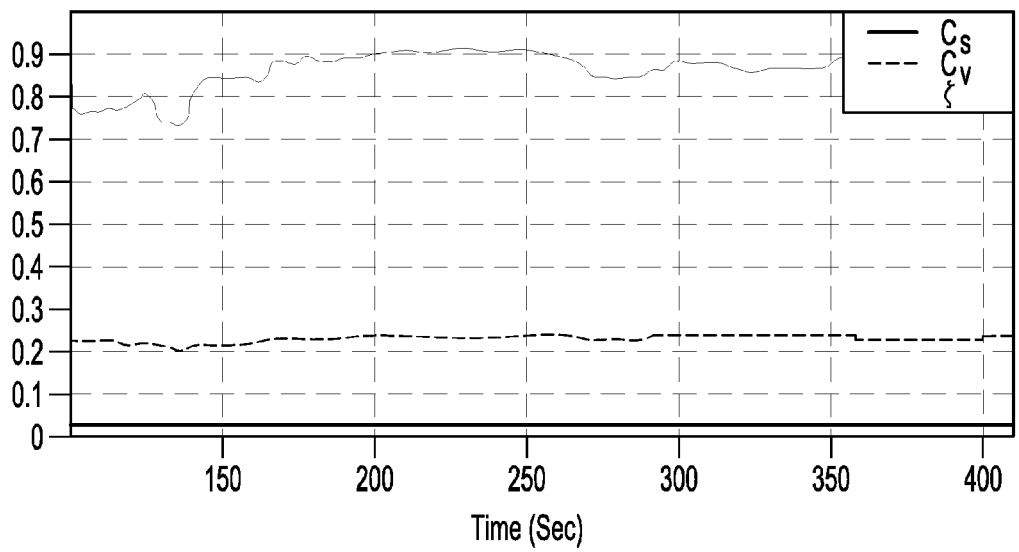
FIG. 20 is a plot of select example parameters characterizing the cautious driving of FIG. 19.

In the 2nd run, the driver was using cautious throttle and brake application to achieve car following, the relative range error $\Delta s_k - \mu u_k(\Delta s)$ in FIG. 19 had less magnitude in comparison with the one shown in FIG. 17. The identified $c_v$ and $c_s$ are depicted in FIG. 20. The damping ratio showed a value greater than 0.8 except during the first 150 seconds. See, FIG. 20. This is an indication of a heavy damping driver-in-the-loop system, hence corresponding to cautious driving behavior.

VIII. Applications

The handling limit and/or driving style characterization, with proper monitoring and re-enforcement, may be used for driver advising, coaching, monitoring and safety enforcement. Another possible application relates to the opportunity for vehicle personalization through tuning of control parameters to fit the specific driver's style. For example, the ESC or brake control system can exploit such a driver style characterization to adapt the actuation threshold to fit the personal driving behavior. As an example, an expert driver might need less frequent ESC activations compared to a less experienced driver in facing the same driving conditions. (There may, however, be a minimum requirement for adjusting the thresholds such that a mistake by an expert driver can still be assisted by the ESC function).

As another example, steering sensitivity (the degree of vehicle steering response to a given steering input) and accelerator pedal sensitivity (the degree of vehicle acceleration response to a given accelerator pedal input) may be tuned based on the driver characterization. The steering wheel and/or accelerator pedal may be made more sensitive if the driver is characterized as an expert (providing greater vehicle responsiveness). The steering wheel and/or accelerator pedal may be made less sensitive if the driver is characterized as cautious (potentially leading to improved fuel economy). Other applications are also possible.

Figure 21:
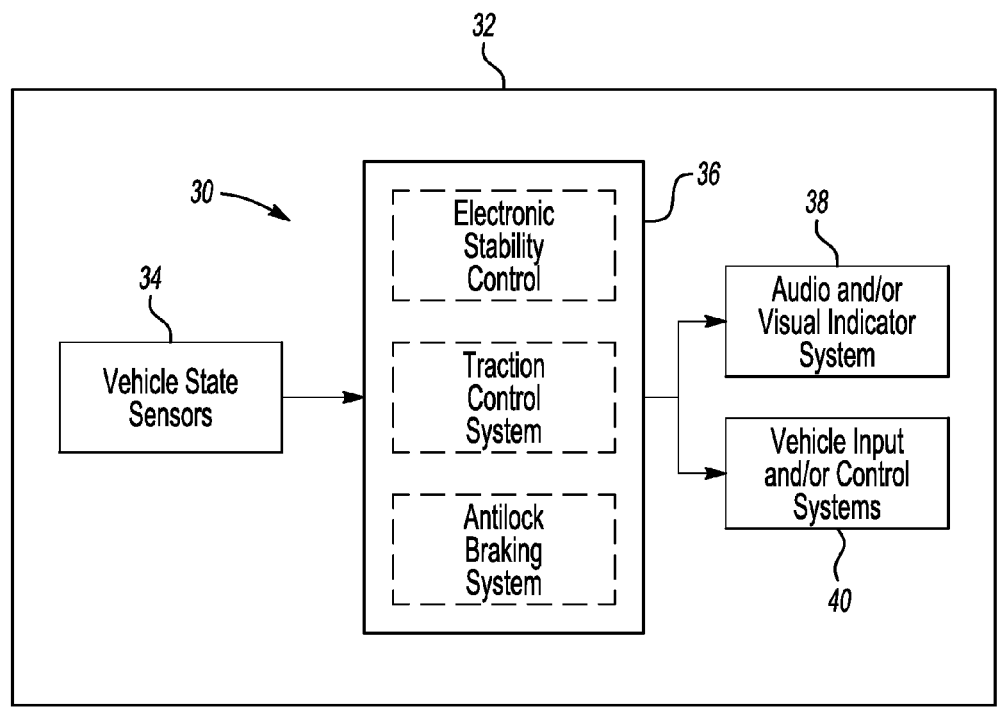
FIGS. 21 through 23 are block diagrams of embodiments of driver advisory systems.

FIG. 21 is a block diagram of an embodiment of an advisory system 30 for a vehicle 32. The advisory system 30 may include a plurality of vehicle state sensors 34 (e.g., yaw rate sensor, steering angle sensor, lateral acceleration sensor, longitudinal acceleration sensor, wheel speed sensor, brake pressure sensor, etc.), one or more controllers 36 configured to perform, for example, electronic stability control, antilock braking and traction control as well as the handling limit and driver characterization described above, an audio and/or visual indicator system 38 (e.g., a display panel, speaker system, LED array, USB port, etc.), and a vehicle input and/or control system 40 (e.g., accelerator pedal, powertrain controller, steering wheel, etc.)

The vehicle state sensors 34 may detect the various parameters described above, such as vehicle speed, wheel slip, etc., that characterize the motion of the vehicle 32 (e.g., current handling condition and limit handling condition) as well as the driver inputs described above (e.g., accelerator and brake pedal position, etc.) The one or more controllers 36 may use this information as inputs to the handling limit and/or driver characterization algorithms described above. Based on the output of these algorithms, the one or more controllers 36, as described above, may (i) activate the audio and/or visual indicator system 38 to, for example, alert or coach the driver or (ii) modify aspects of the vehicle input and/or control system 40 to customize the vehicle's response to the type of driver.

As an example, based on information gathered by the sensors 34, the one or more controllers 36, executing the algorithms described above, may determine that a driver of the vehicle 32 is driving recklessly. Because the driver has been classified as reckless, the one or more controllers 36 may, for example, begin to issue driving instructions via the audio and/or visual indicator system 38 to encourage the driver to change their behavior. The one or more controllers 36 may also/instead activate haptic elements of the vehicle input and/or control system 40, such as a haptic accelerator pedal, to alert the driver of their reckless behavior.

A memory accessible by the one or more controllers 36 may include a database of instructions (audio and/or visual) that are mapped with certain predefined rules. An example rule may be that if a driver is reckless and the rate of steering wheel angle change falls within some defined range for a specified period of time (that is, the driver continues to rapidly rotate the steering wheel clockwise and counter-clockwise), then instruct the driver to reduce their steering inputs.

Figure 22:
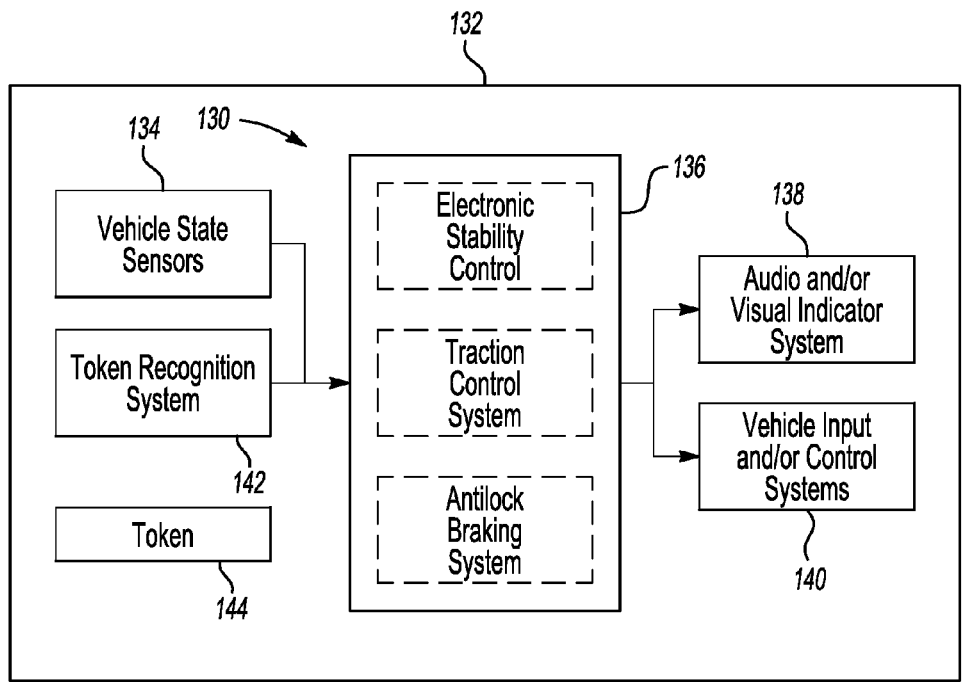

FIG. 22 is a block diagram of another embodiment of an advisory system 130 for a vehicle 132, where like numerals have descriptions similar to those of FIG. 21. In this embodiment, however, the vehicle 132 includes a token recognition system 142 configured in a known fashion to recognize a token 144. As an example, the token 144 may be a key including an identification chip identifying a particular driver or class of drivers (e.g., teen drivers). In this example, the token recognition system 142 may include a chip reader arranged in a known fashion within an ignition system of the vehicle 132 to read the identification chip and communicate this information to the one or more controllers 136. As another example, the token 144 may be a key-fob or plastic card having an RFID chip embedded therein. In this example, the token recognition system 142 may include an RFID chip reader arranged in a known fashion within the vehicle 132 to detect and read the RFID chip and communicate this information to the one or more controllers 136. As yet another example, the token 144 may be a cell phone. In this example, the token recognition system 142 may include known modules (such as Ford's SYNC technology) configured to recognize the cell phone and communicate this information to the one or more controllers 136. Other arrangements and scenarios are also possible.

A variety of functions may be implemented based on driver identification and the handling limit and/or driving style characterization described above. As an example, if the token recognition system 142 supplies information to the one or more controllers 136 identifying the driver as a teen driver, the one or more controllers 136 may issue instructions to the driver via the audio and/or visual indicator system 138 to drop throttle or to brake as the handling limit is being approached. The one or more controllers 136 may implement rule based commands similar to those described above to effectuate such driving instruction. (An example rule may be that if the driver is a teen driver and if the handling limit margin is less than 15%, then instruct the driver to slow down.)

As another example, if the token recognition system 142 supplies information to the one or more controllers 136 identifying the driver as a teen driver, the one or more controllers 136 may record a history of the calculations of handling limit margin and/or driver style characterization in order to generate reports describing driving behavior. These reports, for example, may detail, for a given trip, the number of times the teen driver exceeded certain levels of the handling limit margin. These reports, for example, may also describe the teen driver as cautious, aggressive, reckless, etc. during any given trip. Such reports may be accessed, reported or displayed in any suitable/known fashion, such as through the audio and/or visual indicator system 138.

As yet another example, driver coaching and/or instruction may be implemented based on the driver identification described above. The one or more controllers 136 may, for example, issue instructions to encourage a driver to provide driving inputs to the vehicle 132 that will result in the driver being classified as cautious. If, for example, a driver begins to frequently accelerate and decelerate, the one or more controllers 136 may instruct the driver via the audio and/or visual indicator system 138 to increase the distance between the vehicle 132 and vehicle in front of them so as to reduce the frequency of acceleration and braking. Rules similar to those described above, or any other suitable intelligence technology such as neural networks, etc. may be used to facilitate the instructions. In embodiments where driving behavior is recorded for later reporting, whether the driver heeds or ignores the instructions may also be recorded as an indication of the driver's behavior.

Figure 23:
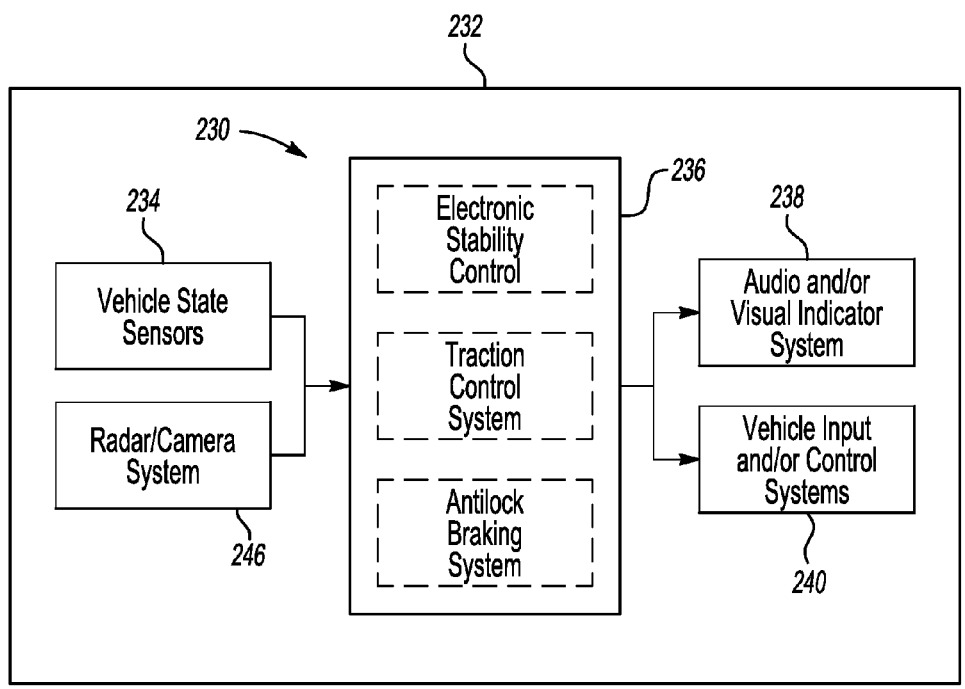

FIG. 23 is a block diagram of yet another embodiment of an advisory system 230 for a vehicle 232, where like numerals have descriptions similar to those of FIG. 21. This embodiment includes a radar and/or camera system 246 (any suitable forward sensing system, however, may be used) that may periodically/continuously detect, in a known fashion, the distance between the vehicle 232 and another vehicle in front of the vehicle 232. (Although not shown, the advisory system 230 may also include a token recognition system and associated capabilities similar to that discussed with reference to FIG. 22. Other configurations are also possible.)

In certain circumstances, the distance information collected by the system 246 may be monitored by the one or more controllers 236. If the distance is less than some predefined threshold (e.g., 20 feet), the one or more controllers 236 may warn the driver via the audio and/or video indicator system 238 and/or activate elements of the vehicle input and/or control systems 240 if they are of the haptic type (e.g., haptic accelerator pedal, haptic steering wheel, haptic seat, etc.)

In other circumstances, the distance information, X, collected by the system 246, together with the change in distance over time, $V_x$, and longitudinal acceleration of the vehicle 232, $A_x$, may used by the one or more controllers 236 to determine a time to collision, $t_c$, with the vehicle in front of the vehicle 232 by the following equation $$t_c = \frac{-V_x \pm \sqrt{(V_x)^2 + 2(A_x)(X)}}{(A_x)}$$

$$\text{or } t_c = \frac{X}{V_x}$$

If the time to collision is less than a predefined threshold, the one or more controllers 236 may warn the driver as described above.

In still other circumstances, the one or more controllers 236 may base the warning threshold on the gap time (discussed above) between the vehicle 232 and the vehicle in front of it. If the gap time is less than a threshold value, the one or more controllers 236 may, for example, activate (vibrate) haptic elements of the vehicle input and/or control systems 240, etc.

Alternatively, the one or more controllers 236 may access tables of distance and speed/relative speed to determine when to warn the driver. As an example, if the distance falls within a certain range and the speed falls within a certain range, the one or more controllers 236 may activate a haptic accelerator pedal. Other scenarios are also possible.

The intensity (frequency and/or amplitude) with which haptic elements of the vehicle input and/or control systems 240 are activated may depend on the distance, time to collision, gap time, etc. between the vehicle 232 and the vehicle in front of it. As an example, the intensity may increase as these parameters decrease. This increasing intensity may signal increasing urgency.

The predefined thresholds may depend on the type of driver. That is, the one or more controllers 236 may implement the driver characterization algorithms discussed above and, based on the characterization, increase or decrease the warning threshold. A threshold may be decreased, for example, for an expert driver because they may be less likely to experience an accident as a result of tailgating. A threshold may be increased for a reckless or aggressive driver because they may be more likely to experience an accident as a result of tailgating, etc.

The predefined thresholds may be altered based on whether the driver heeds the warning they indicate. As an example, if a driver does not increase their following distance to the vehicle in front of them after activation of a haptic accelerator pedal, the predefined following distance that is used to trigger the activation of the haptic pedal may be decreased so as to avoid becoming a nuisance to the driver. The predefined thresholds associated with time to collision and gap time may be similarly decreased. A minimum, however, may be established beyond which the threshold will not be decreased.

As apparent to those of ordinary skill, the algorithms disclosed herein may be deliverable to a processing device, which may include any existing electronic control unit or dedicated electronic control unit, in many forms including, but not limited to, information permanently stored on non-writable storage media such as ROM devices and information alterably stored on writeable storage media such as floppy disks, magnetic tapes, CDs, RAM devices, and other magnetic and optical media. The algorithms may also be implemented in a software executable object. Alternatively, the algorithms may be embodied in whole or in part using suitable hardware components, such as Application Specific Integrated Circuits (ASICs), state machines, controllers or other hardware components or devices, or a combination of hardware, software and firmware components.

While embodiments of the invention have been illustrated and described, it is not intended that these embodiments illustrate and describe all possible forms of the invention. The words used in the specification are words of description rather than limitation, and it is understood that various changes may be made without departing from the spirit and scope of the invention.

What is claimed:

1. A vehicle comprising:
    a haptic interface; and
    a controller configured to
        activate the haptic interface responsive to a distance between the vehicle and another vehicle being less than a threshold distance initially set according to a learned driver behavior that is based on how a driver is driving the vehicle, and
        decrease the threshold distance to not less than a predefined minimum responsive to the distance not increasing following activation of the haptic interface.

2. The vehicle of claim 1 wherein the haptic interface is a haptic accelerator pedal.

3. The vehicle of claim 1 wherein the controller is further configured to activate the haptic interface at an intensity that depends on the distance between the vehicles.

4. The vehicle of claim 3 wherein the intensity increases as the distance decreases.

5. The vehicle of claim 1 wherein the threshold distance is decreased to a predefined minimum.

6. A vehicle comprising:
    a haptic interface; and
    a controller configured to
        responsive to a time to collision with another vehicle being less than a threshold time initially set according to a learned driver behavior that is based on how a driver is driving the vehicle, activate the haptic interface, and
        responsive to the time to collision not increasing following activation of the haptic interface, decrease the threshold time to not less than a predefined minimum.

7. The vehicle of claim 6 wherein the haptic interface is a haptic accelerator pedal.

8. The vehicle of claim 6 wherein the controller is further configured to activate the haptic interface at an intensity that depends on the time to collision.

9. The vehicle of claim 8 wherein the intensity increases as the time to collision decreases.

10. A method for advising a driver of a vehicle comprising:
    by a processor,
        responsive to a gap time between the vehicle and another vehicle being less than a threshold time initially set according to a learned driver behavior that is based on how the driver is driving the vehicle, activating a haptic interface; and
        responsive to the gap time not increasing following activation of the haptic interface, decreasing the threshold time to a predefined minimum.

11. The method of claim 10 wherein the haptic interface is activated with an intensity that depends on the gap time.

12. The method of claim 10 wherein the threshold time is decreased to a predefined minimum.

* * * * *